US012808178B2

(12) United States Patent
Barlow et al.

(10) Patent No.: US 12,808,178 B2
(45) Date of Patent: Nov. 24, 2026

(54) CLAMP ATTACHMENT FOR BOOM OF TELESCOPIC HANDLER AND METHOD OF ASSEMBLING AND PLACING DECKING MATERIAL ON A BUILDING USING THE CLAMP ATTACHMENT

(71) Applicant: Innovatech Systems, LLC, Kanarraville, UT (US)

(72) Inventors: James Barlow, Kanaraville, UT (US); James Harker, Kanarraville, UT (US)

(73) Assignee: Innovatech Systems, LLC, Kanarraville, UT (US)

( * ) Notice: Subject to any disclaimer, the term of this patent is extended or adjusted under 35 U.S.C. 154(b) by 822 days.

(21) Appl. No.: 18/179,766

(22) Filed: Mar. 7, 2023

(65) Prior Publication Data

US 2023/0220659 A1 Jul. 13, 2023

Related U.S. Application Data

(63) Continuation of application No. 16/509,334, filed on Jul. 11, 2019, now Pat. No. 11,603,655.

(60) Provisional application No. 62/696,436, filed on Jul. 11, 2018.

(51) Int. Cl.
*E04B 1/24* (2006.01)
*B66C 1/42* (2006.01)
*B66C 1/64* (2006.01)

(52) U.S. Cl.
CPC ............ *E04B 1/2403* (2013.01); *B66C 1/427* (2013.01); *B66C 1/64* (2013.01); *E04B 2001/2424* (2013.01)

(58) Field of Classification Search
CPC .............. E04F 21/1805; E04F 21/1816; E04F 21/1822; E04F 21/1827; E04G 21/167; E04G 21/168; E04D 15/04; E04B 2001/2424; B66C 1/427; B66C 1/64
See application file for complete search history.

(56) References Cited

U.S. PATENT DOCUMENTS 3,462,025 A * 8/1969 Toffolon ............... E04G 21/167 294/81.4
4,671,724 A * 6/1987 Bolton ...................... B66C 1/64 414/10
5,006,032 A * 4/1991 Riedl ..................... B62D 13/04 414/458
5,073,077 A * 12/1991 Altman .................. B66F 9/147 414/722
5,127,791 A * 7/1992 Attman ..................... B66F 9/10 52/745.11
6,336,565 B1 * 1/2002 Merkel .................. B66F 9/061 212/180
9,914,467 B2 * 3/2018 Nyce ......................... B62B 1/10
11,193,287 B2 * 12/2021 Tan ....................... E04G 21/142

(Continued)

*Primary Examiner* — Christine T Cajilig
(74) *Attorney, Agent, or Firm* — Gurr & Brande, PLLC; Robert A. Gurr

(57) ABSTRACT

A boom clamp attachment has a gib frame, a boom quick-connect, a shaft arm axle, a shaft arm torque assembly, and at least one gib clamp assembly. The gib clamp assembly has a clamp support member having a first gib clamp at a first end and second gib clamp at a second end. The gib clamp has a fixed finger and a moveable finger, the moveable finger controlled via hydraulics. The boom clamp may hoist, tilt, and position an assembled section of panels.

10 Claims, 31 Drawing Sheets

(56) References Cited

U.S. PATENT DOCUMENTS

2006/0101782 A1* 5/2006 Sanders .............. E04F 21/1816
52/749.1

* cited by examiner

CLAMP ATTACHMENT FOR BOOM OF TELESCOPIC HANDLER AND METHOD OF ASSEMBLING AND PLACING DECKING MATERIAL ON A BUILDING USING THE CLAMP ATTACHMENT

CROSS-REFERENCE TO RELATED APPLICATIONS

This application is a continuation of U.S. Non-Provisional application Ser. No. 16/509,334, filed on Jul. 11, 2019, which claims the benefit of U.S. Provisional Application Ser. No. 62/696,436, filed on Jul. 11, 2018, both of which are incorporated herein by reference.

TECHNICAL FIELD

The present disclosure relates to building construction. More particularly, the present disclosure relates to a panelization system allowing for ground assembly of suspended building components (e.g., I-beams and panels) and placement of the assembled panels using a clamp attachment for a boom of a telescopic handler.

BACKGROUND

Building construction is a complex and dangerous environment. Often times, several workers must be hoisted to high elevations, where the workers precariously assemble building components. For example, currently in the art, a crane or telescopic handler must raise or hoist individual joist cross-beams into position where a worker must install fasteners to each end of the joist cross-beam, fastening them to girders supported by the building columns. After a sufficient number of joist cross-beams are installed, a decking crew would then receive a load of corrugated decking material via crane or boom forklift and then spread and fasten the decking material over the cross beams. As appreciated, working at this height is dangerous and laborious. Great physical labor is required in climbing to position, bolting cross beams, as well as shifting and attaching the decking. Simple mistakes can lead to injury.

Therefore, there remains a need in the art for a system and method that reduces fall and injury risks, that reduces the number of workers working at elevated heights, that allows workers to assemble the decking material at ground level, and that allows for installation of the assembled decking panels with little labor. The current invention seeks to solve these and other problems.

SUMMARY OF EXAMPLE EMBODIMENTS

In one embodiment, a boom clamp attachment comprises a gib frame, a boom quick-connect, a shaft arm axle, a shaft arm torque assembly, and at least one gib clamp assembly. In one embodiment, the gib clamp assembly comprises a clamp support member having a first gib clamp at a first end and second gib clamp at a second end. In one embodiment, the gib clamp comprises a fixed finger and a moveable finger, the moveable finger controlled via hydraulics.

In one embodiment, a method of using a boom clamp attachment comprises quick-connecting the boom clamp attachment to a telescopic handler. The boom clamp attachment is then positioned beneath an assembled section of panels, the panels fastened to I-beams. Each of the gib clamp assemblies are positioned beneath an I-beam such that the fixed finger and moving finger are on opposite sides of the I-beam. The moving finger is then actuated, causing the moving finger to approximate the fixed finger, clamping the I-beam therebetween. Once clamped, the telescopic handler may lift the section of panels to the desired location for fastening to the building.

DETAILED DESCRIPTION OF EXAMPLE EMBODIMENTS

Figure 1:
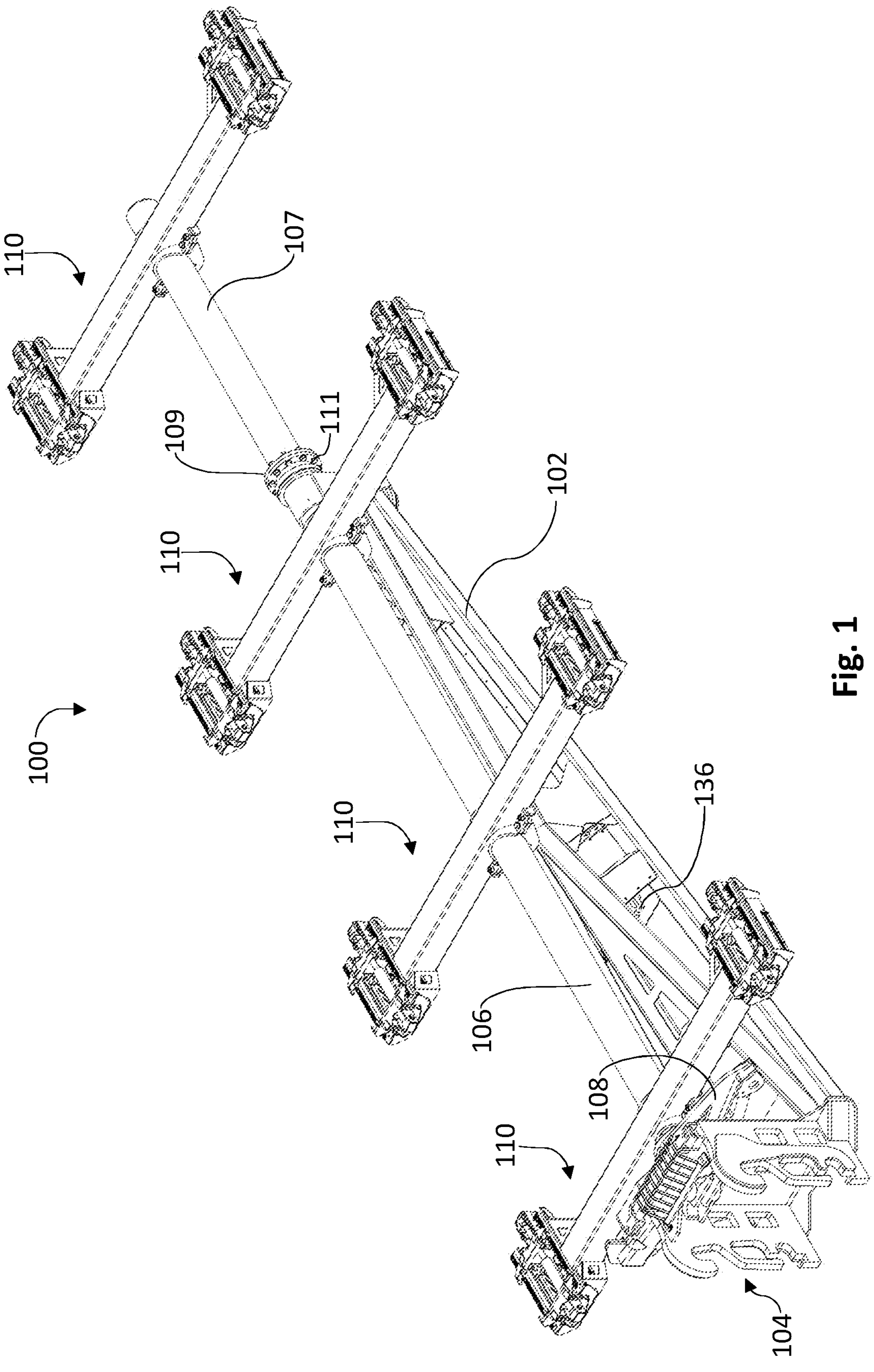
FIG. 1 illustrates a top, rear perspective view of a boom clamp attachment.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need in the art for a system and method that reduces fall and injury risks, that reduces the number of workers working at elevated heights, that allows workers to assemble the decking material at ground level, and that allows for installation of the assembled decking panels with little labor. The boom clamp attachment described below solves these, and other, problems.

Figure 2:
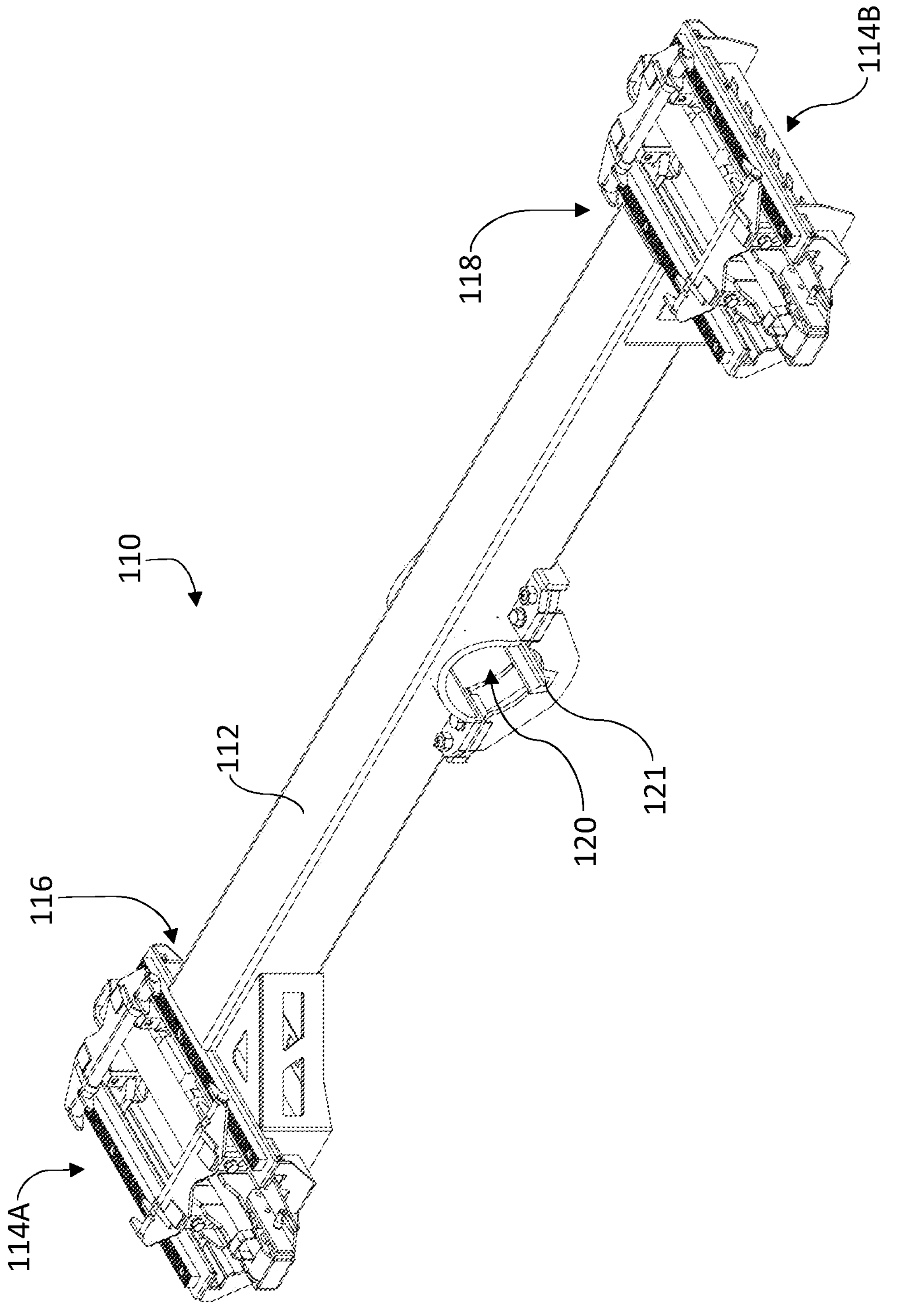
FIG. 2 illustrates a top, front perspective view of a gib clamp assembly of a boom clamp attachment.
Figure 3:
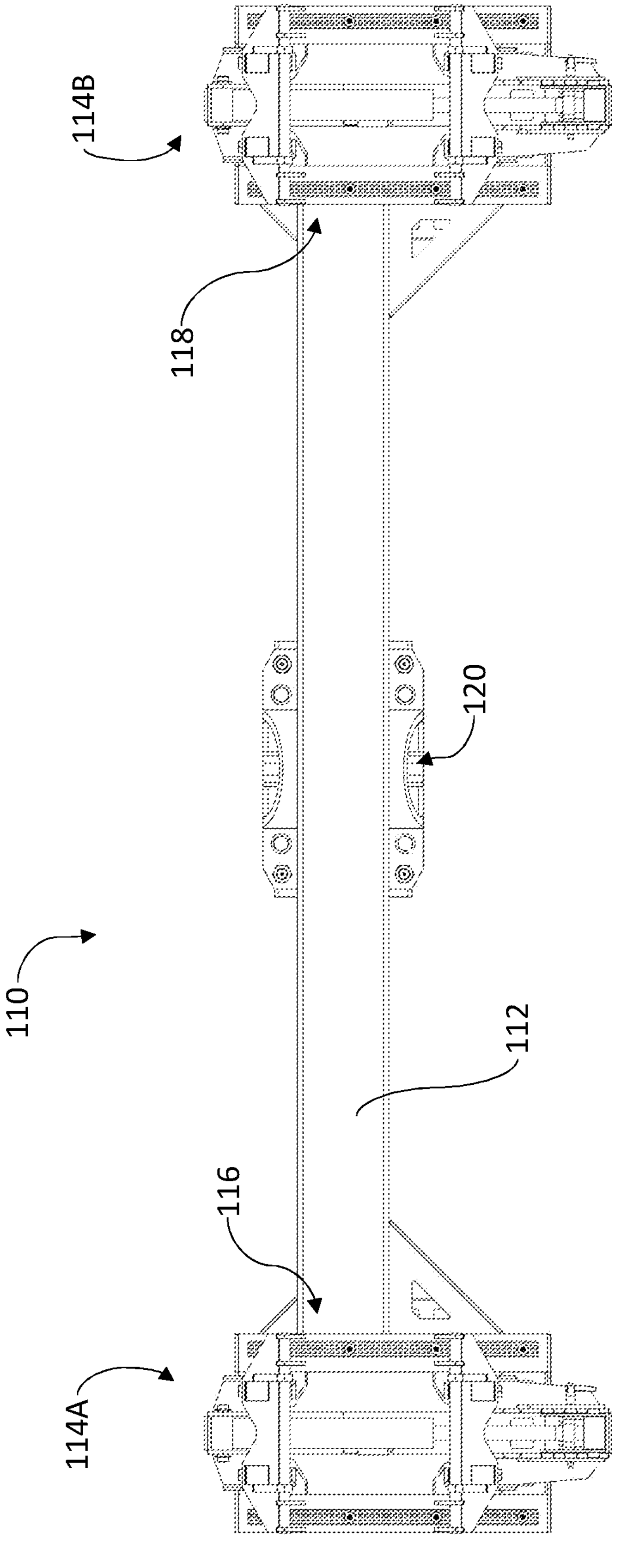
FIG. 3 illustrates a top plan view of a gib clamp assembly of a boom clamp attachment.
Figure 4:
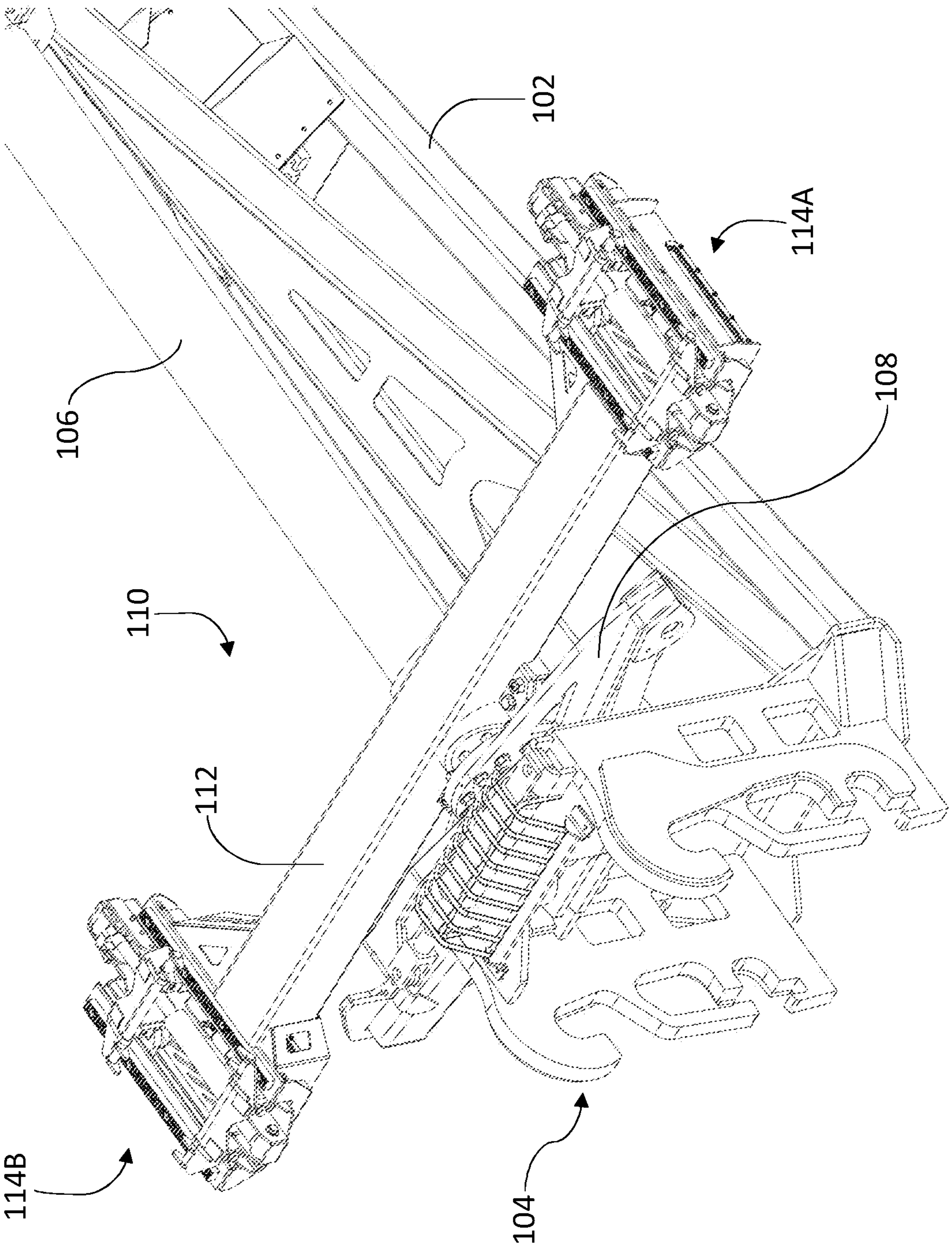
FIG. 4 illustrates a rear, top detailed perspective view of a quick-connect of a boom clamp attachment.

In one embodiment, as shown in FIGS. 1-5, a boom clamp attachment 100 comprises a gib frame 102, a boom quick-connect 104, a shaft arm axle 106, a shaft arm torque assembly 108, and at least one gib clamp assembly 110. Referring to FIGS. 2-4, in one embodiment, the gib clamp assembly 110 comprises a clamp support member 112 having a first gib clamp 114A at a first end 116 and second gib clamp 114B at a second end 118. Each gib clamp assembly 110 is coupled to the shaft arm axle 106 or a shaft arm extension 107 (which may be removably attachable to the shaft arm axle 106 via a coupler 109, which may comprise bolts 111). This may be accomplished using saddle 120, which receives the shaft arm axle 106 and may be secured therethrough using a securing means, such as bolts or welds. It will be appreciated that a plurality of gib clamp assemblies 110 may be coupled to the shaft arm axle 106 and shaft arm extension 107. In other words, if the job requires larger sections, one or more shaft arm extensions 107 may be coupled to the shaft arm axle 106 so as to accommodate moving larger sections of panels. This allows a worker to lift and place large panel assemblies, as will be described later herein.

Figure 5:
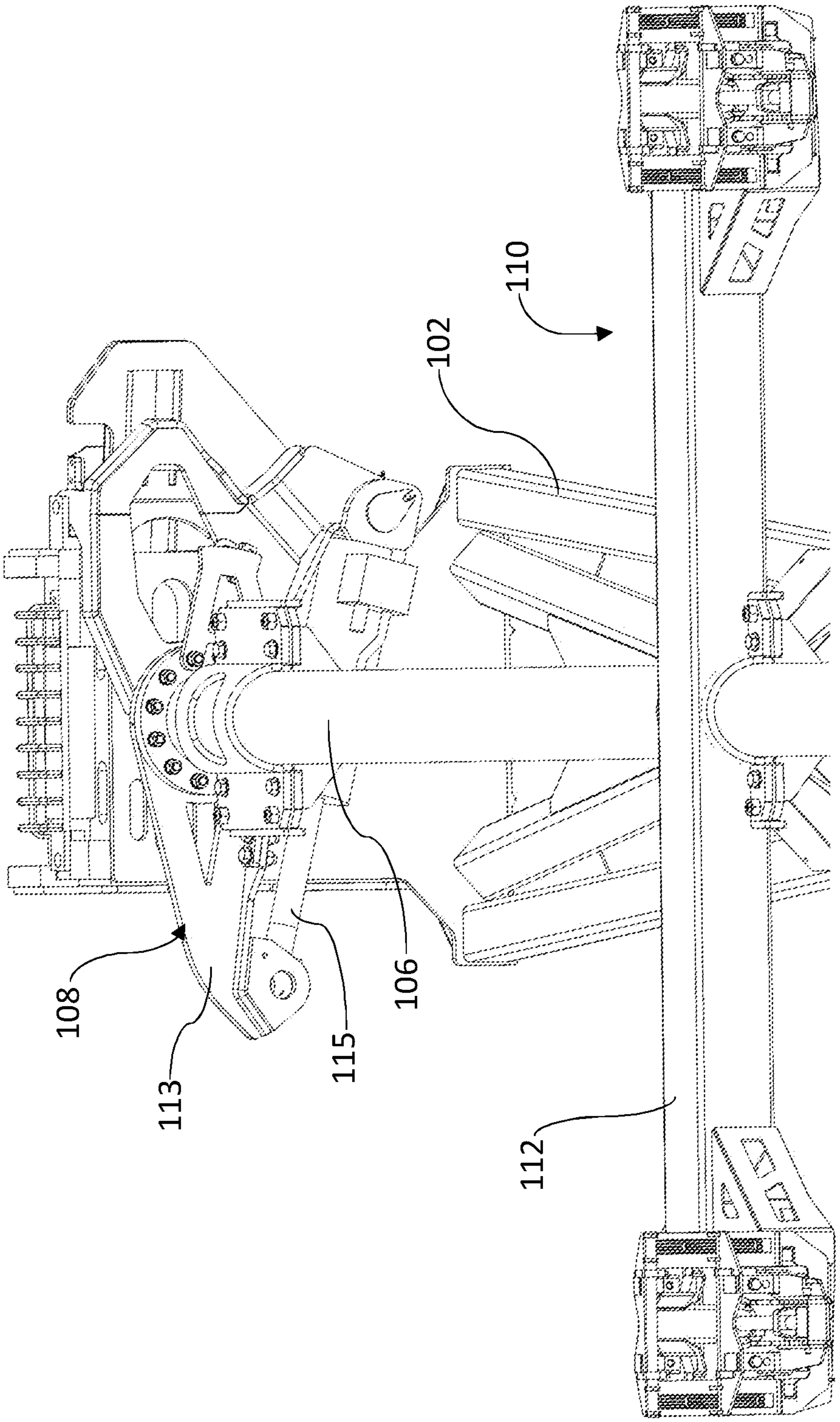
FIG. 5 illustrates a front, top detailed perspective view of a shaft arm torque assembly of a boom clamp attachment.
Figure 6:
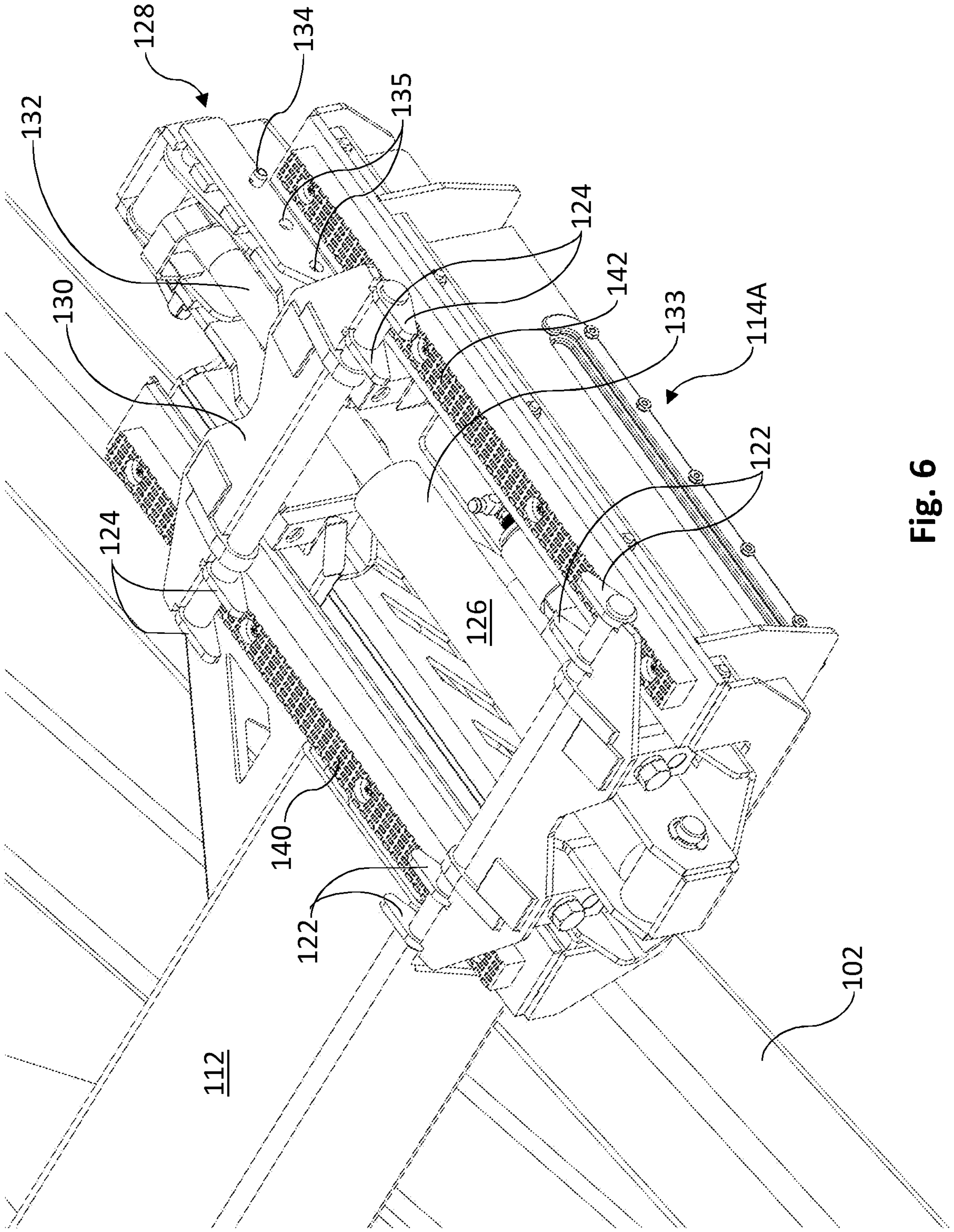
FIG. 6 illustrates a rear, top perspective view of a gib clamp of a boom clamp attachment.
Figure 7:
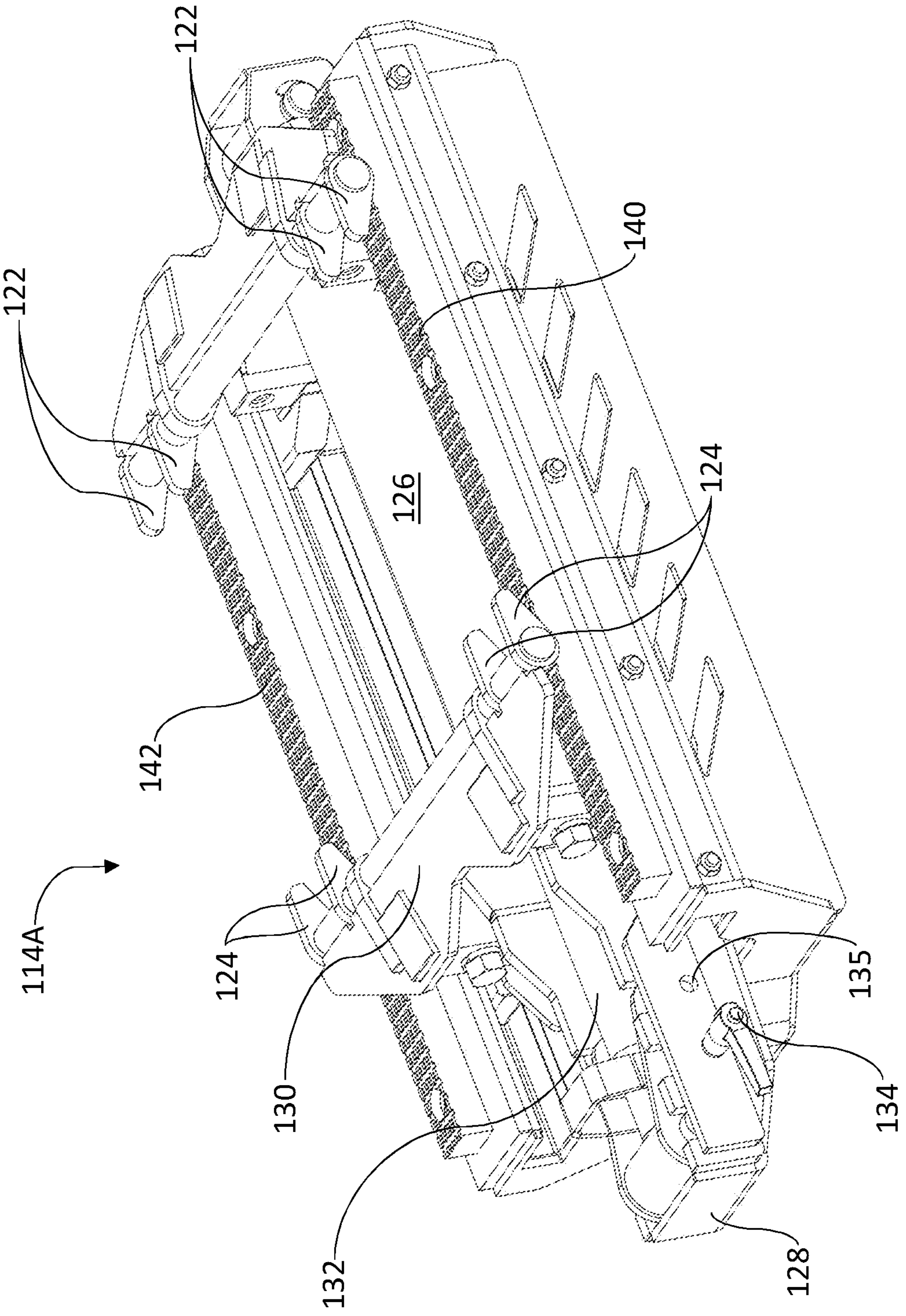
FIG. 7 illustrates a front, top perspective view of a gib clamp of a boom clamp attachment.
Figure 8:
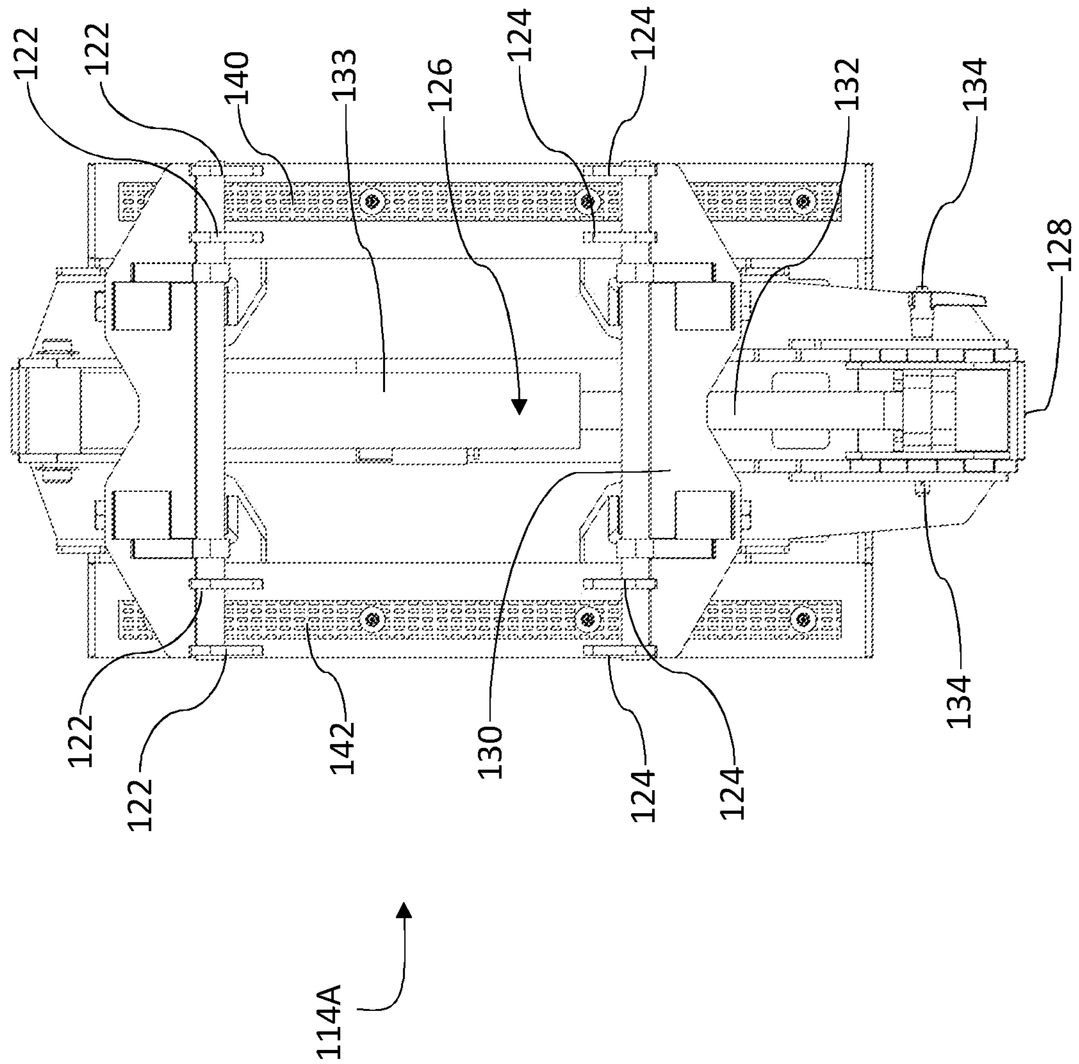
FIG. 8 illustrates a top plan view of a gib clamp of a boom clamp attachment.
Figure 9:
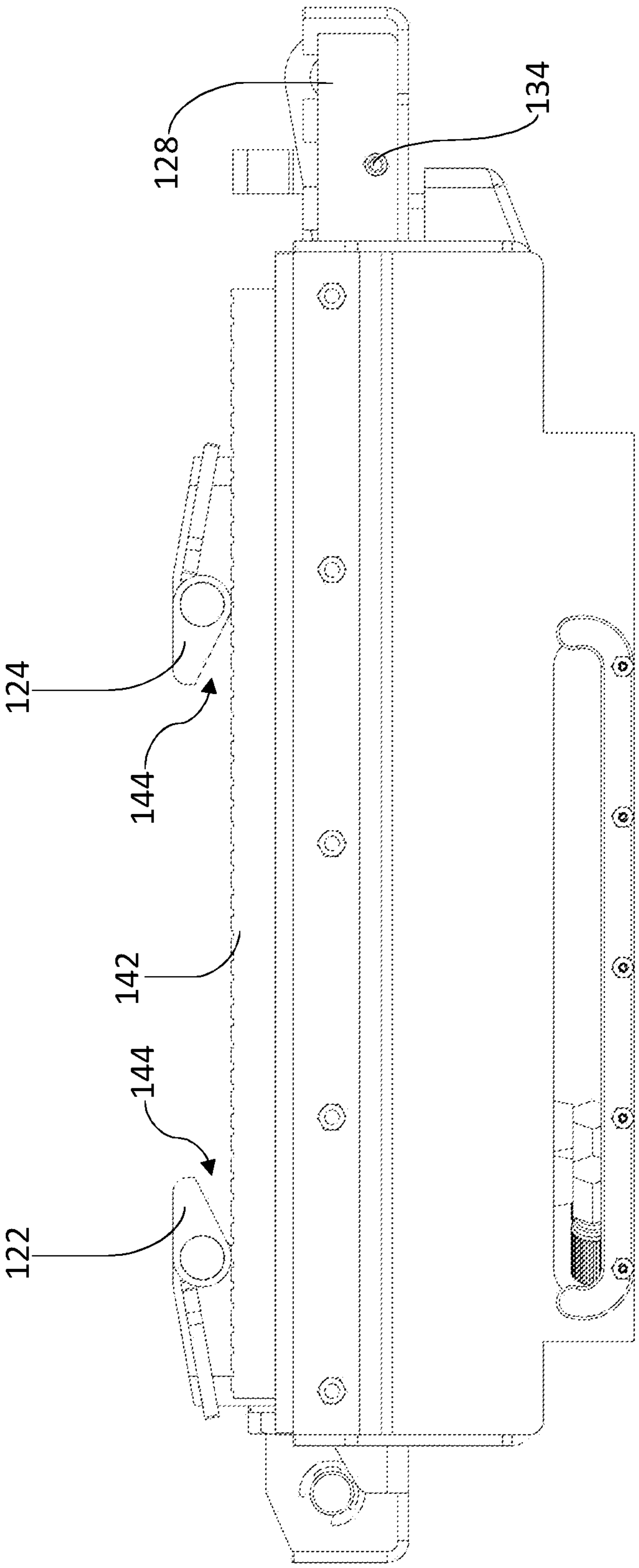
FIG. 9 illustrates a right, side elevation view of a gib clamp of a boom clamp attachment.

FIG. 5 illustrates the shaft arm torque assembly 108 in more detail. As shown, a torque bracket 113 is actuated using a linear actuator 115 (e.g., piston and cylinder). As the hydraulic pressure increases, the linear actuator 115 extends, causing rotation of the torque bracket 113, which is coupled to the shaft arm axle 106. As a result, the shaft arm axle 106 likewise rotates along its longitudinal axis.

Figure 10:
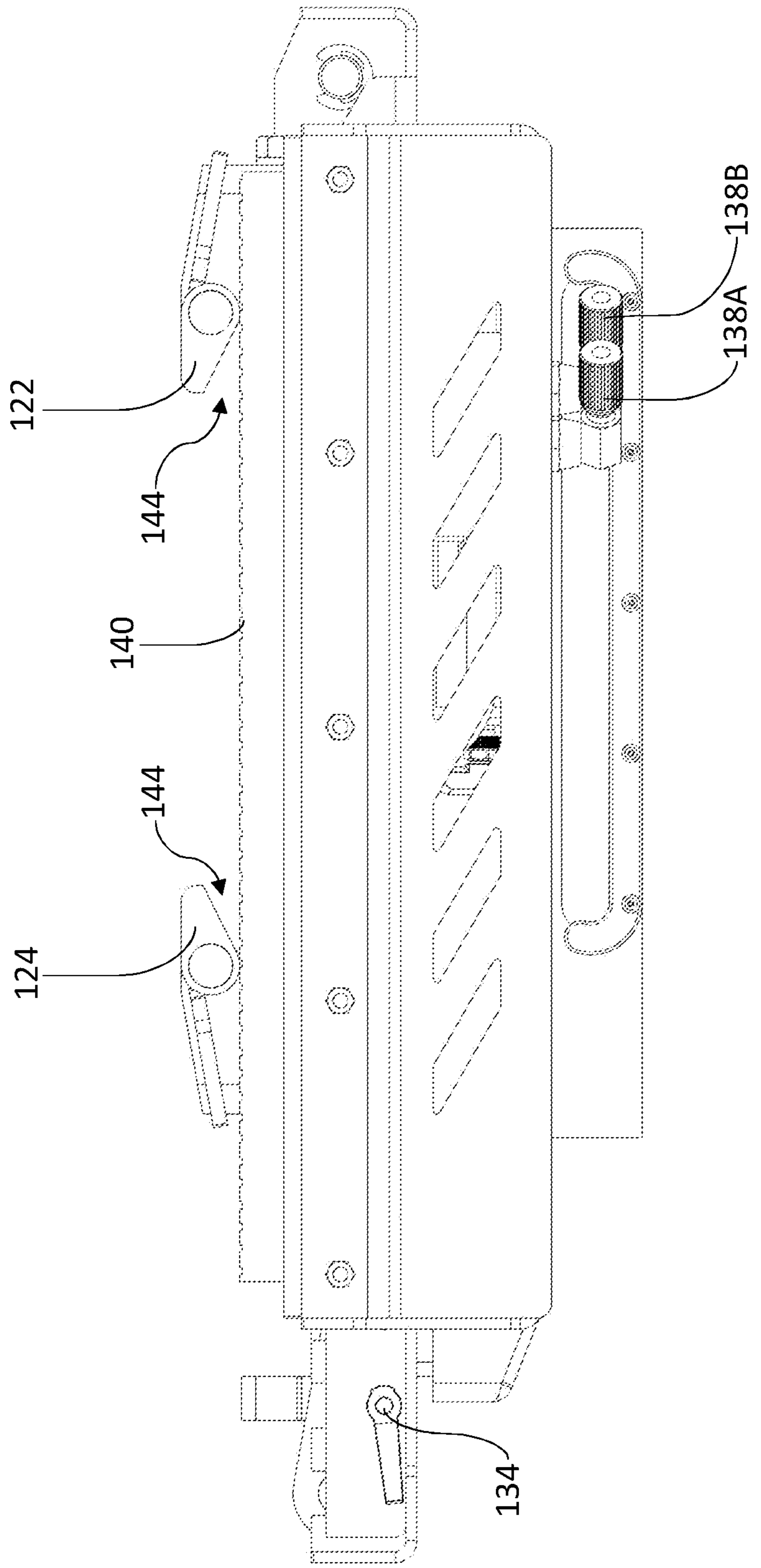
FIG. 10 illustrates a left, side elevation view of a gib clamp of a boom clamp attachment.
Figure 11:
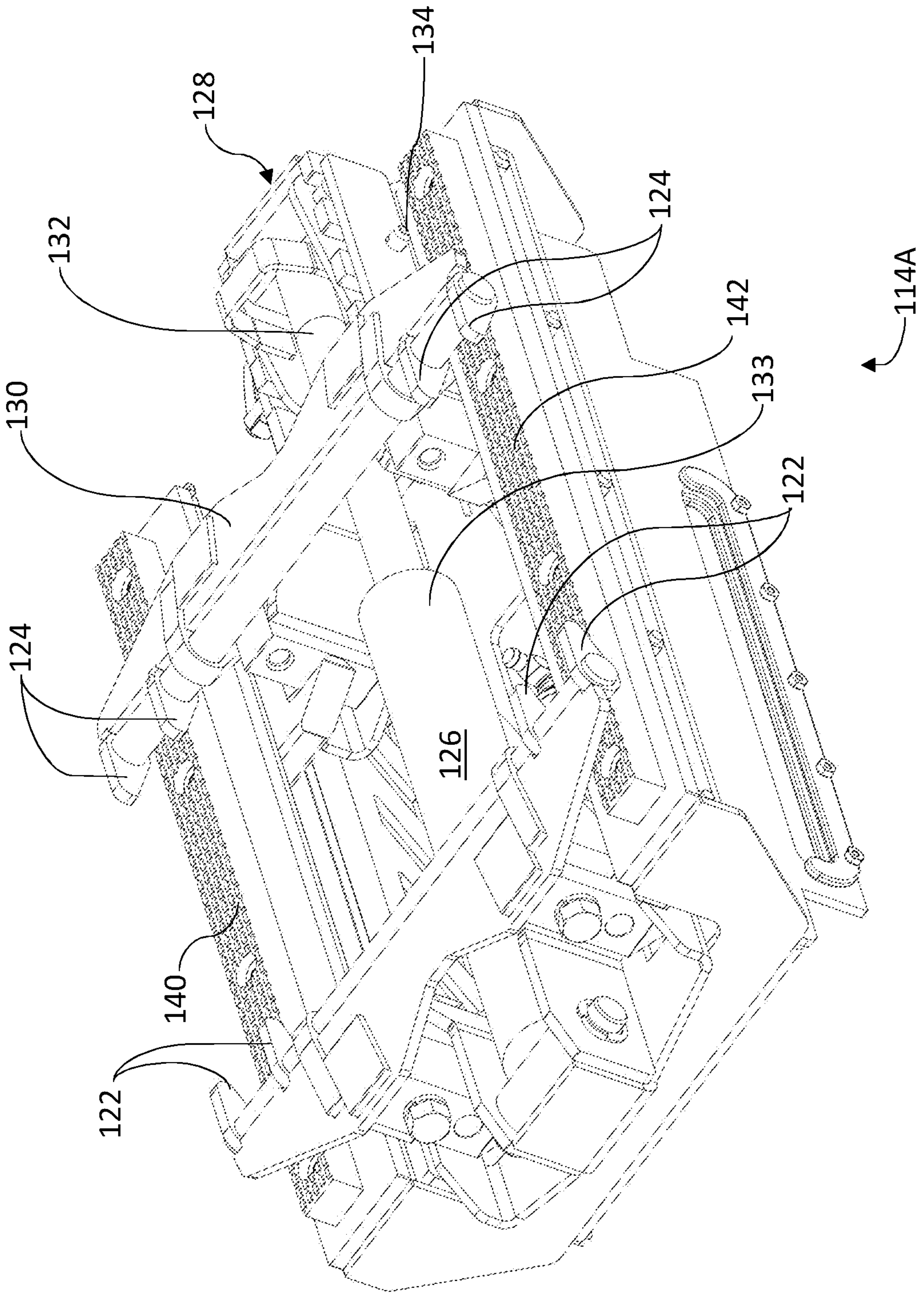
FIG. 11 illustrates a top, rear perspective view of a gib clamp of a boom clamp attachment.

In one embodiment, as best shown in FIGS. 6-12, the gib clamp 114A comprises one or more fixed fingers 122 (i.e., immovable) and one or more moveable fingers 124. The fixed fingers 122 may be secured using bolts or welds. A linear actuator 126 (e.g., piston and cylinder) actuates the moveable fingers 124, allowing them to move linearly towards or away from the fixed fingers 122. For example, in one embodiment, a clamp adjustment member 128 allows for the distance to be varied between the fixed fingers 122 and the moveable fingers 124. The clamp adjustment member 128 may be coupled to a moveable finger frame 130 and to a piston 132 of the linear actuator 126, such as by using a locking pin 134. The piston 132 may be controlled using a hydraulic bank 136 (FIG. 1), which is coupled to the linear actuator 126 using hydraulic ports 138A, 138B (FIG. 10). This allows the boom operator to decrease the distance, or increase the distance, between the fixed fingers 122 and moveable fingers 124, as needed. For example, as the hydraulic pressure is decreased, the piston 132 moves into the cylinder 133. Because the piston 132 is coupled to the moveable finger frame 130 via the clamp adjustment member 128, both the moveable finger frame 130 and the moveable fingers 124 coupled thereto move toward the fixed fingers 122. The distance between the fixed fingers 122 and the moveable fingers 124 may be further decreased or increased by selectively coupling the clamp adjustment member 128 via locking pin apertures 135. In other words, the locking pin 134 may be removed, the clamp adjustment member 128 adjusted as needed, and then the locking pin 134 may be re-inserted into the appropriate locking pin aperture 135. The locking pin 134 may also pass through (or otherwise be coupled to) the piston 132. It will be appreciated that while referenced herein as fixed fingers 122, they are not required to be fixed (i.e., immovable). In other words, in an alternate embodiment, both fingers 122 and 124 would be moveable and would approximate each other during hydraulic actuation. Further, while hydraulics are shown and described, the boom clamp attachment 100 is not so limited. In other words, electronically controlled mechanisms may be used, such as a rack and pinion mechanism with electric motor, or similar methods of linear actuation.

In one embodiment, the gib clamp 114A comprises a first grip plate 140 and a second grip plate 142. The grip plates 140, 142 may be positioned beneath the one or more fixed and moveable fingers 122 and 124. As the moveable fingers 124 move linearly, they remain proximal to the grip plates 140, 142. For example, an I-beam may contact the first and second grip plates 140, 142, respectively. The moveable fingers 124 are then actuated, decreasing the distance between the moveable fingers 124 and the fixed fingers 122 until the I-beam is clamped between the fixed fingers 122 and moveable fingers 124. The fixed fingers 122 and the moveable fingers 124 may each have a receiving aperture 144 (FIG. 9) interposed between the fingers 122, 124 and the grip plates 140, 142, respectively. This receiving aperture 144 allows components to be secured thereunder, ensuring a secure clamping action on the desired component (e.g., I-beam).

Referring to FIGS. 13-17, in one embodiment, a boom clamp attachment 200 comprises a boom quick-connect 202, a shaft arm 204, a shaft arm torque assembly 206 (e.g., one or more hydraulic pistons and cylinders), and at least one gib clamp assembly 208. Shaft arm 204 may be coupled to first arm 203 via quick-connect assembly 205 (e.g., tongue and groove or similar). As shown, the gib clamp assembly 208 comprises a clamp support member 210 having a first gib clamp 212A and a second gib clamp 212B at opposing ends of the clamp support member 210. As shown, the shaft arm 204 can be rectangular in shape, although other shapes may also be used (e.g., 106 in FIG. 1 is cylinder shaped). The shaft arm torque assembly 206 may be hydraulically controlled and allows an operator to rotate the shaft arm 204 along its longitudinal axis, thereby pivoting the at least one gib clamp assembly 208. While hydraulics are shown and described, other mechanisms may be used, such as electric motors with cogs.

FIGS. 14-17 illustrate a gib clamp 212A in one embodiment. The gib clamp 212A may comprise a fixed bracket 214 (i.e., immovable) and moveable bracket 216. Fixed bracket 214 may comprise clamping protrusions 218 and moveable bracket may comprise clamping protrusions 220. Each clamping protrusion 218, 220 may further comprise receiving apertures 222, 224, respectively. The clamping protrusions 218, 220 may also be referred to "clamping fingers" herein. The gib clamp 212A may further comprise a first grip plate 226 and a second grip plate 228, each grip plate positioned to come into contact with an I-beam (or other style of beam or component) during use. The moveable bracket 216 may be moveable using one or more linear actuators 230. As shown, but without being limiting, the linear actuators comprise a piston 232A, 232B and cylinder 234A, 234B. The pistons 232A, 232B may be coupled to the moveable bracket 216 via a piston bracket 236. The maximum width between the clamping protrusions 218 and 220 may be varied by a user adjusting the fixed position of the piston 232A, 232B in the piston bracket 236. For example, a securing pin 238 is selectively positionable in rack apertures 238 in piston bracket 236. Further, the position of the fixed bracket 214 may also be selectively positionable using a locking pin 242 and locking apertures 244. It will be appreciated that the gib clamps 114A, 114B may be used with boom clamp attachment 100 or 200, and that gib clamps 212A, 212B may likewise be used with boom clamp attachment 100 or 200.

Figure 12:
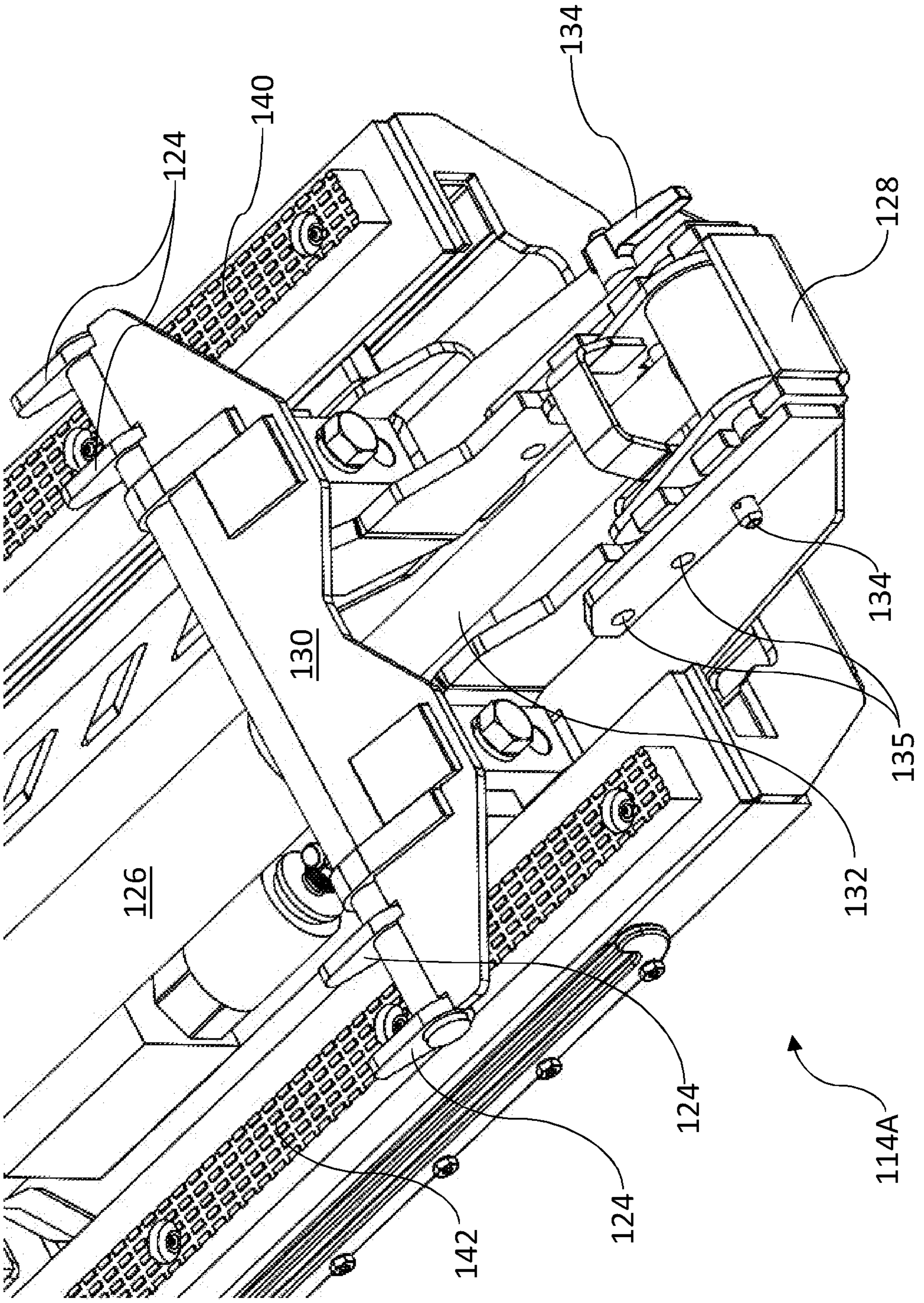
FIG. 12 illustrates a top, detailed perspective view of a gib clamp of a boom clamp attachment.

The clamp support member 210 is receivable within clamp support member receiving aperture 246, where it may be secured in place using bolts, welds, or other securing mechanisms. As shown in FIG. 12, the clamp support member 210 is perpendicular to, and received within shaft arm 204. Again, it may be secured using bolts, welds, or other securing means.

As further shown, in one embodiment, the gib clamp 212A may comprise a light 248 for providing light to the worksite. The light 248 may be in a fixed position or may be moveable, such as by using an electric motor and a controller, or similar mechanisms.

Figure 13:
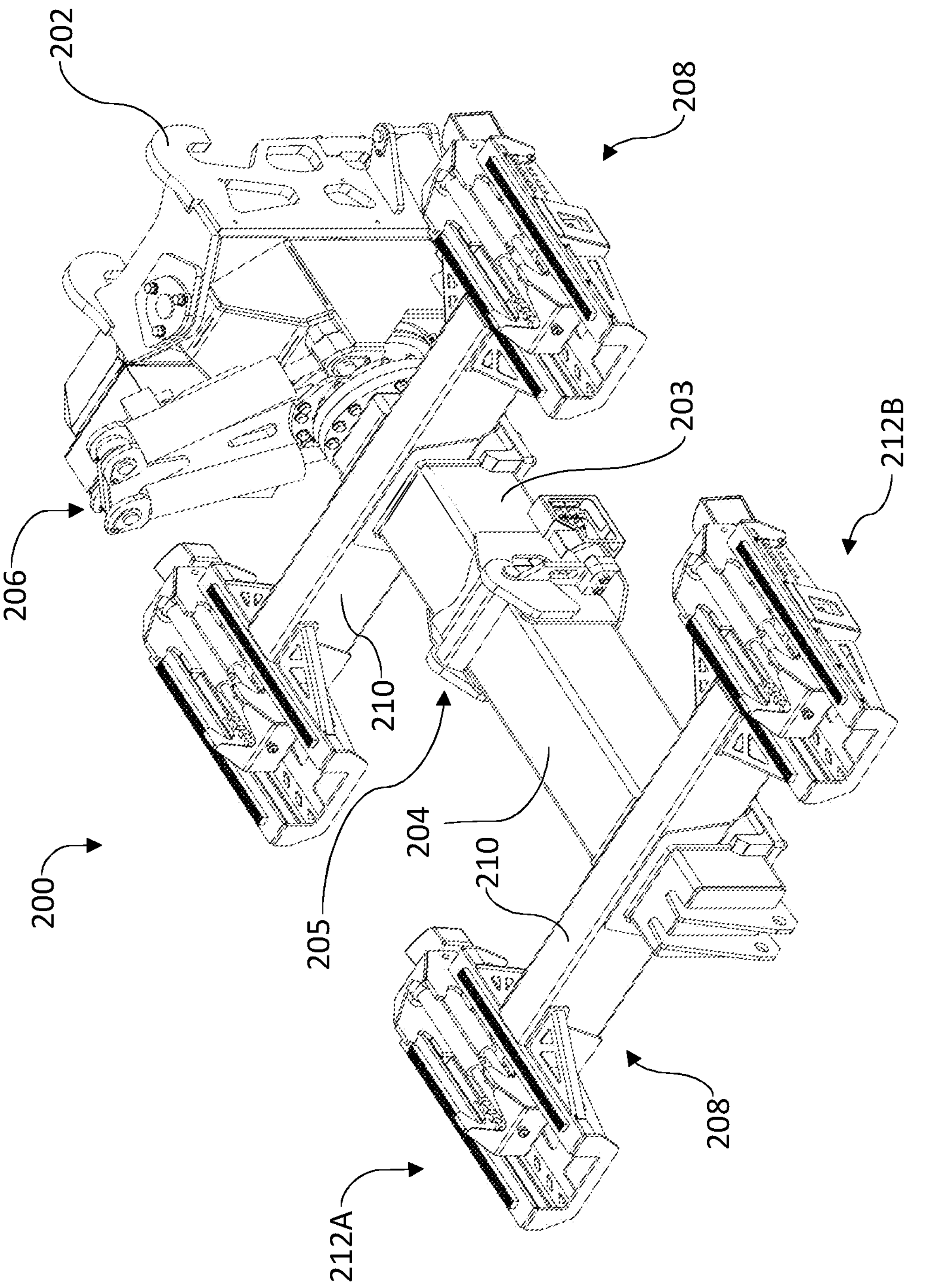
FIG. 13 illustrates a front, top perspective view of a boom clamp attachment.
Figure 14:
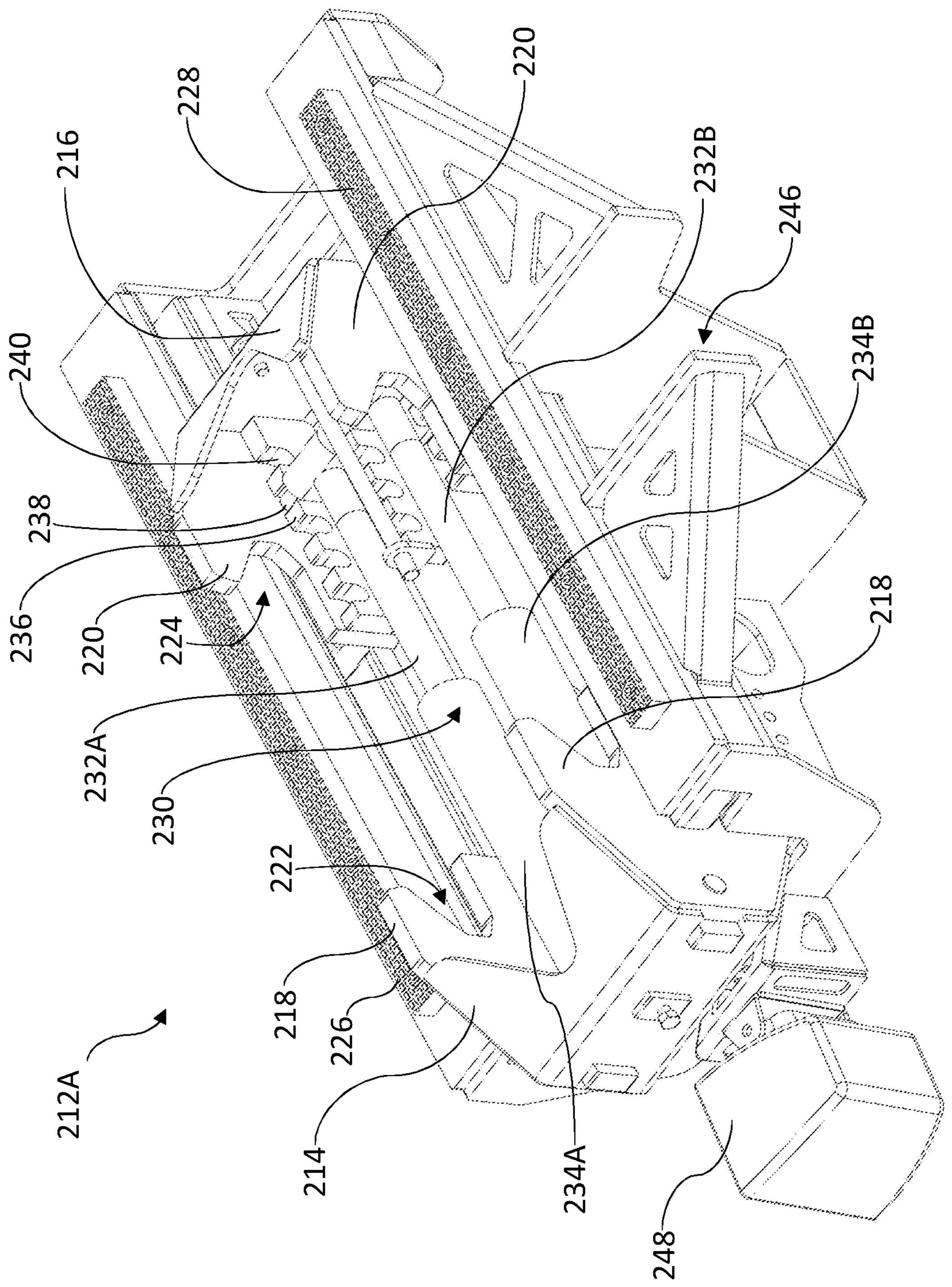
FIG. 14 illustrates a top, rear perspective view of a gib clamp of a boom clamp attachment.
Figure 15:
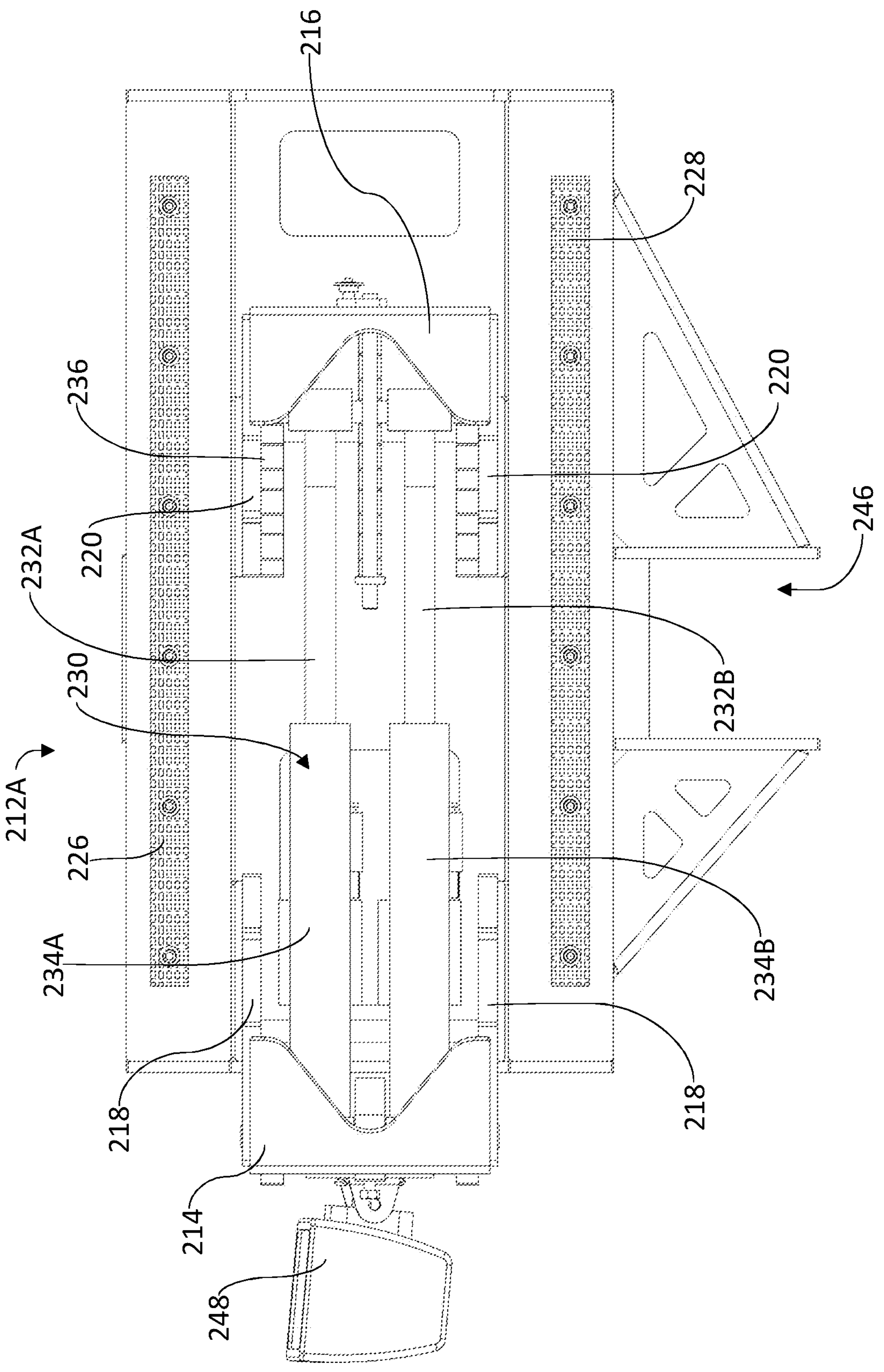
FIG. 15 illustrates a top plan view of a gib clamp of a boom clamp attachment.
Figure 16:
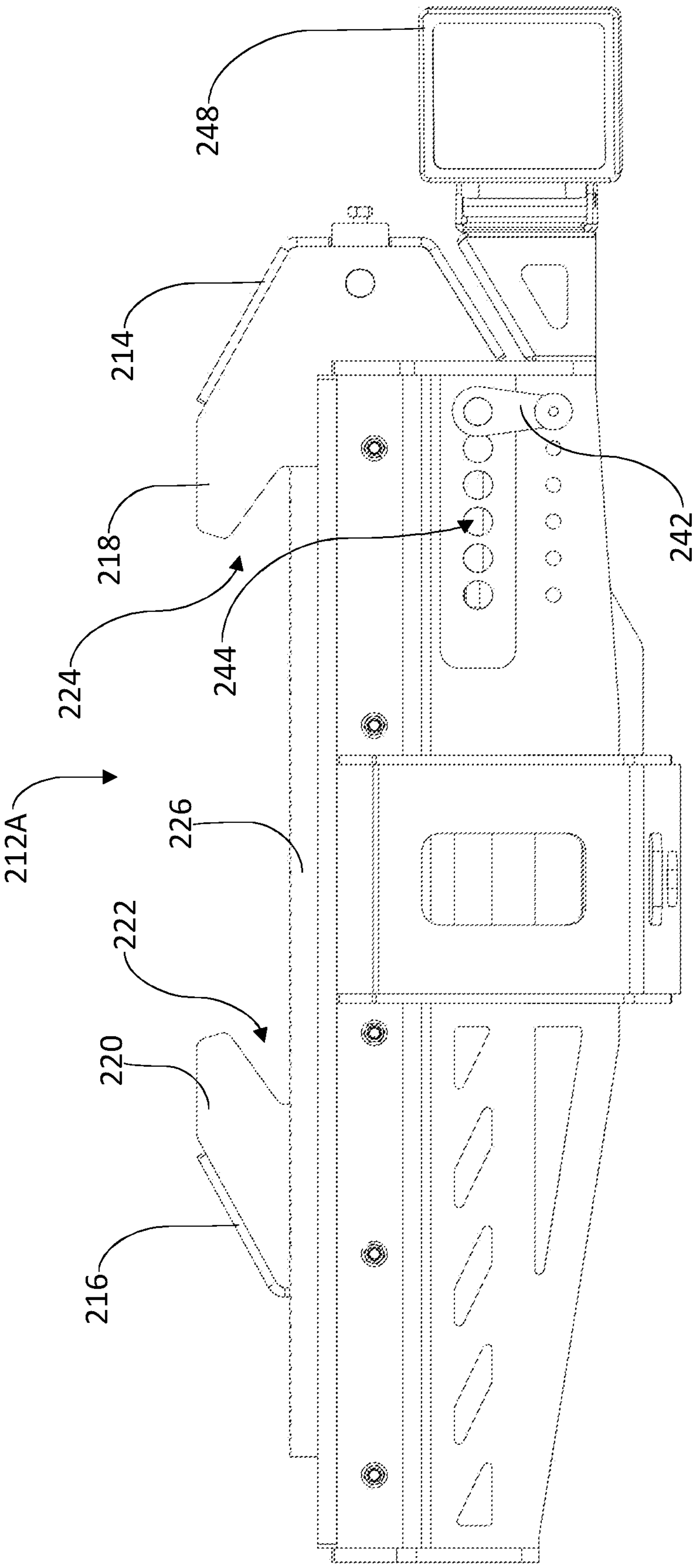
FIG. 16 illustrates a left, side elevation view of a gib clamp of a boom clamp attachment.
Figure 17:
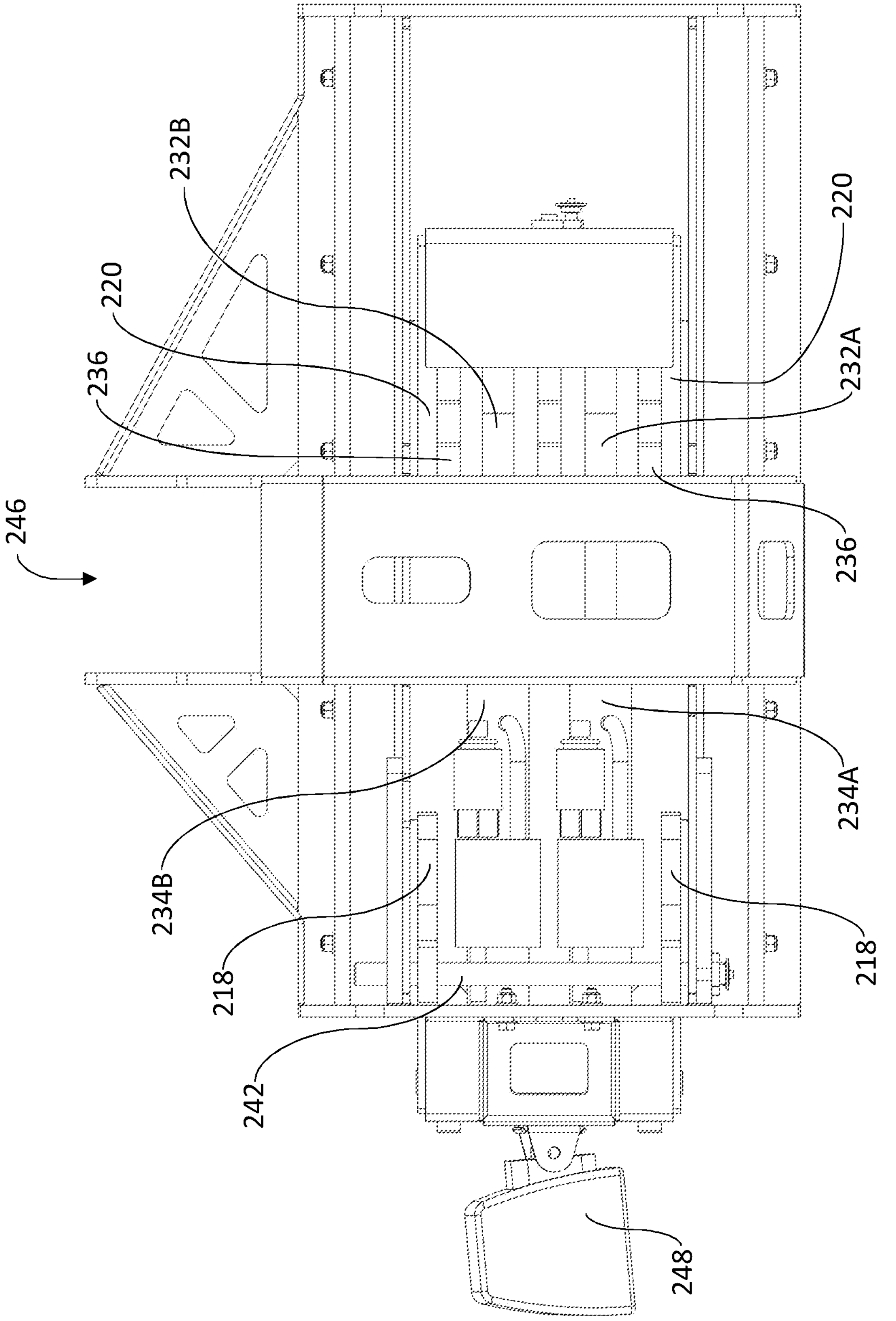
FIG. 17 illustrates a bottom, plan view of a gib clamp of a boom clamp attachment.
Figure 18:
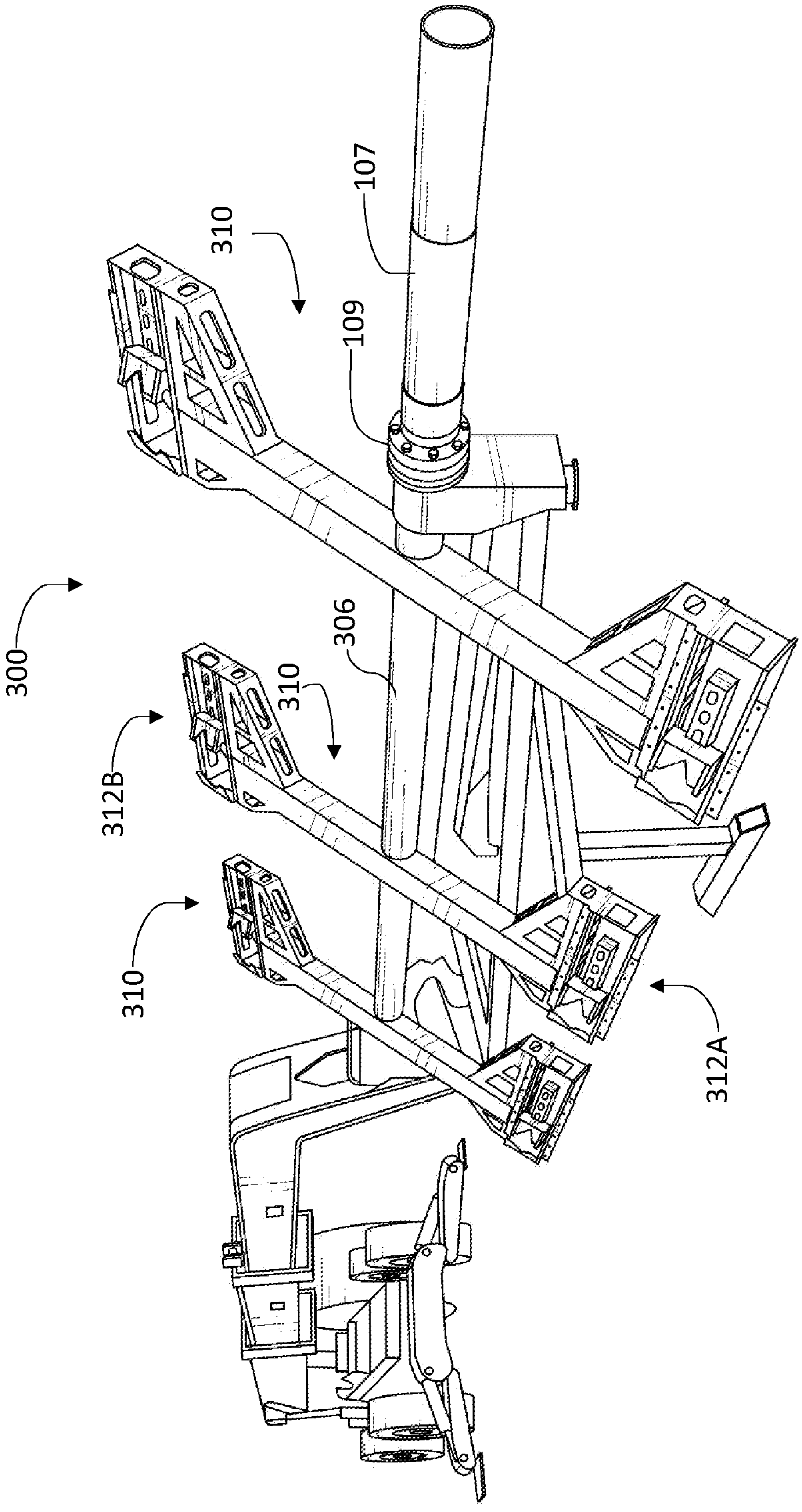
FIG. 18 illustrates a front perspective view of a boom clamp attachment coupled to a telescopic handler, the boom clamp attachment tilted in relation thereto.

Referring to FIG. 18, in one embodiment, the boom clamp attachment 300 may be pivoted using the shaft arm torque assembly (e.g., 108 in FIGS. 1 and 4, or 206 in FIG. 13). This allows the shaft arm axle 306 to rotate along its longitudinal axis, pivoting the gib clamp assemblies 310 (which may comprise gib clamps 312A, 312B, as shown). It is appreciated that the shaft arm axle 306 is rotatably coupled to a quick-connect (e.g., 104 via torque bracket 113 in FIGS. 1-5). This allows a section of panels to be tilted for maneuvering between beams of a building for easier placement, as described and illustrated later. The gib clamp assembly 310 is positioned and secured by combination of the gib clamp arm saddle (e.g., gib clamp arm saddle 120 and a keyway 121 in FIG. 2), which prevents unwanted rotation and keeps a linear array of gib clamp assemblies 310 positioned on the same geometric plane.

Figure 19:
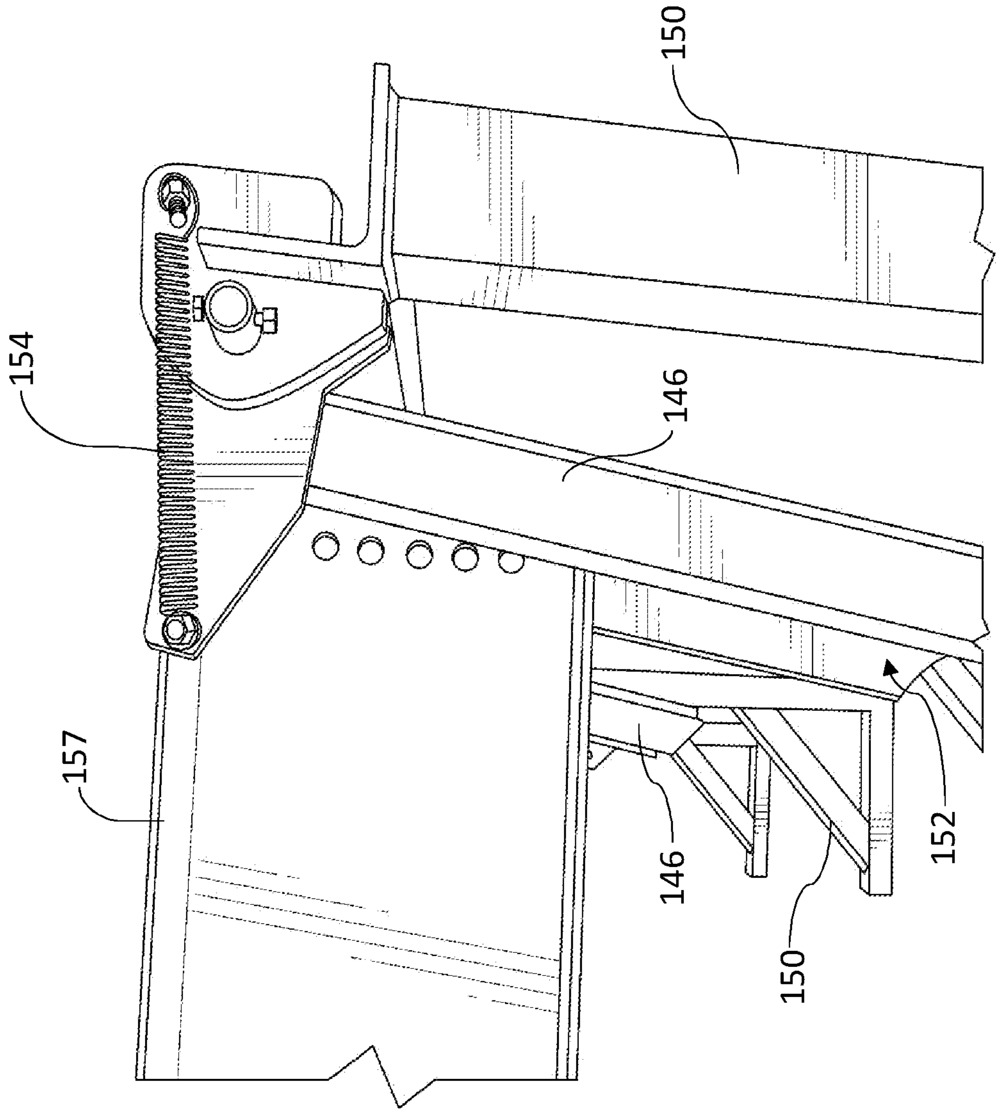
FIG. 19 illustrates a system and method of assembling a panel section at ground level.
Figure 20:
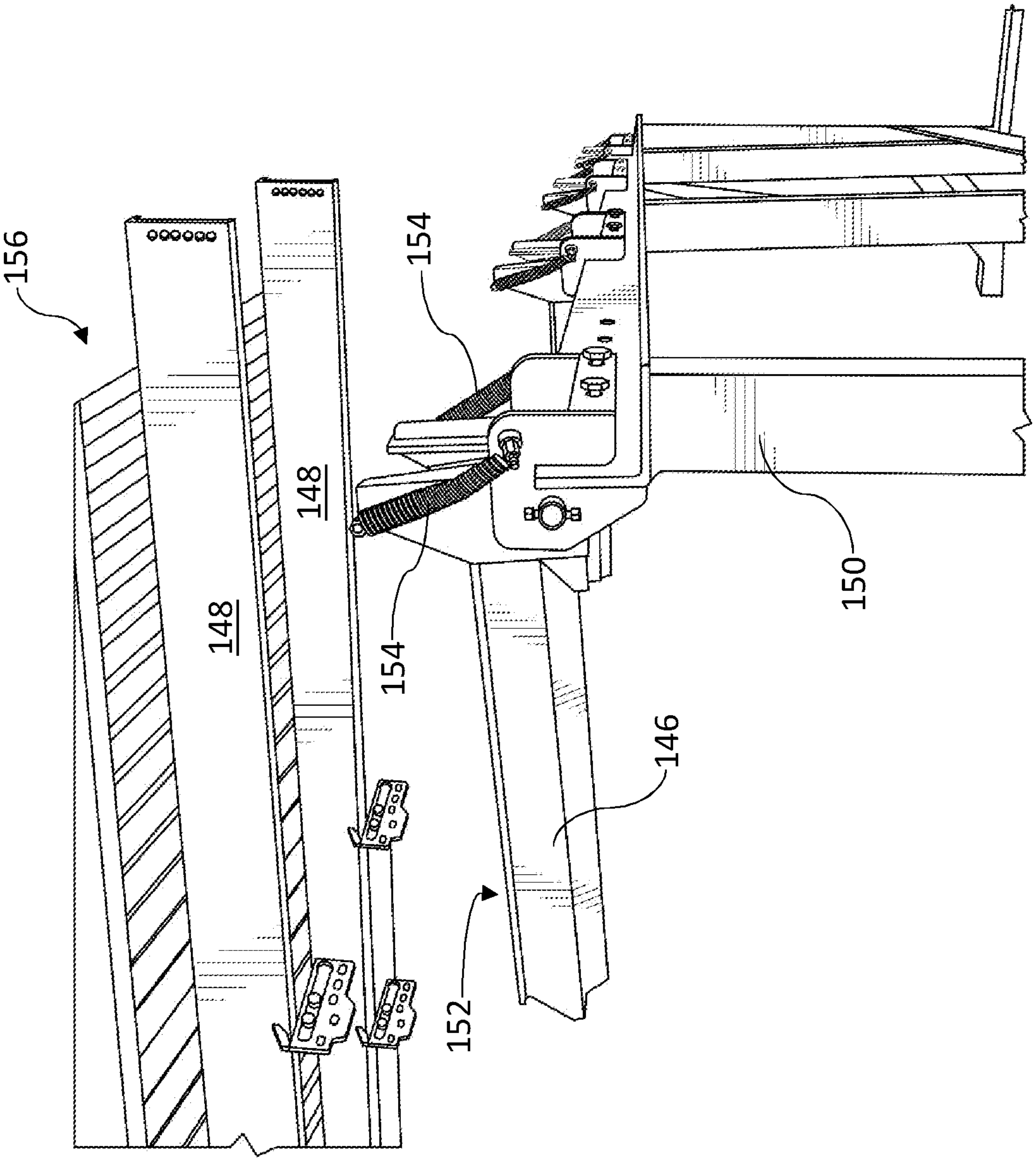
FIG. 20 illustrates a system and method of assembling a panel section at ground level with a boom clamp attachment hoisting a panel section.

Use of the boom clamp attachment 100, 200, 300 allows panel sections (e.g., decking material) to be assembled near ground level, allowing workers to assemble the panels into a desired section for placement on a building. As shown in FIGS. 19-20, a plurality of beam holding brackets 146 may be used to position I-beams 148 for assembling. The beam holding brackets 146 are secured to ground structure 150, which ensures proper distance and placement for the I-beams 148, and that allows for workers to be at ground level for assembly of the panel section. This is an important improvement over the prior art, as it allows workers to be at ground level, reducing the risk of falling and reducing significant injury. For example, a fork-lift operator lifts an I-beam 148 and navigates to place the I-beam 148 between a pair of beam holding brackets 146 (one at each end of the I-beam), and, once in location, lowers the I-beam 148 into the receiving side 152. As the weight of the I-beam 148 is applied to the receiving side 152, which is held up in the receiving position (horizontal) by a spring 154, the receiving side 152 pivots downward (as shown in FIG. 20). This downward motion serves the purpose of accepting the I-beam 148 and captivating the sides of the I-beam 148 in a manner that defines its exact position. Ensuring a center position of the I-beam 148 in the receiving side 152 (e.g., slot) may be accomplished by the geometry of the receiving side 152. For example, the receiving side 152, or a portion thereof, may be V-shaped so as to funnel the I-beam 148 to the center.

Side-to-side movement of the beam 148 is prevented by means of the I-beam flanges abutting the walls of the receiving side 152. Once an I-beam 148 is fully seated between pairs of beam holding brackets 146, the full weight of the I-beam 148 is held and suspended by its own top flange 157, as shown in FIG. 19.

Referring to FIG. 20, after assembly of the panel section 156 (e.g., corrugated sheeting) is complete, the completed section 156 is raised from the beam holding brackets 146 using the boom clamp attachment 100, 200, 300. As the weight of the panel section 156 is removed, the beam holding brackets 146 rotate back into the receiving position (horizontal) with the relief of the spring 154 bringing it into position to accept another beam 148.

Figure 21:
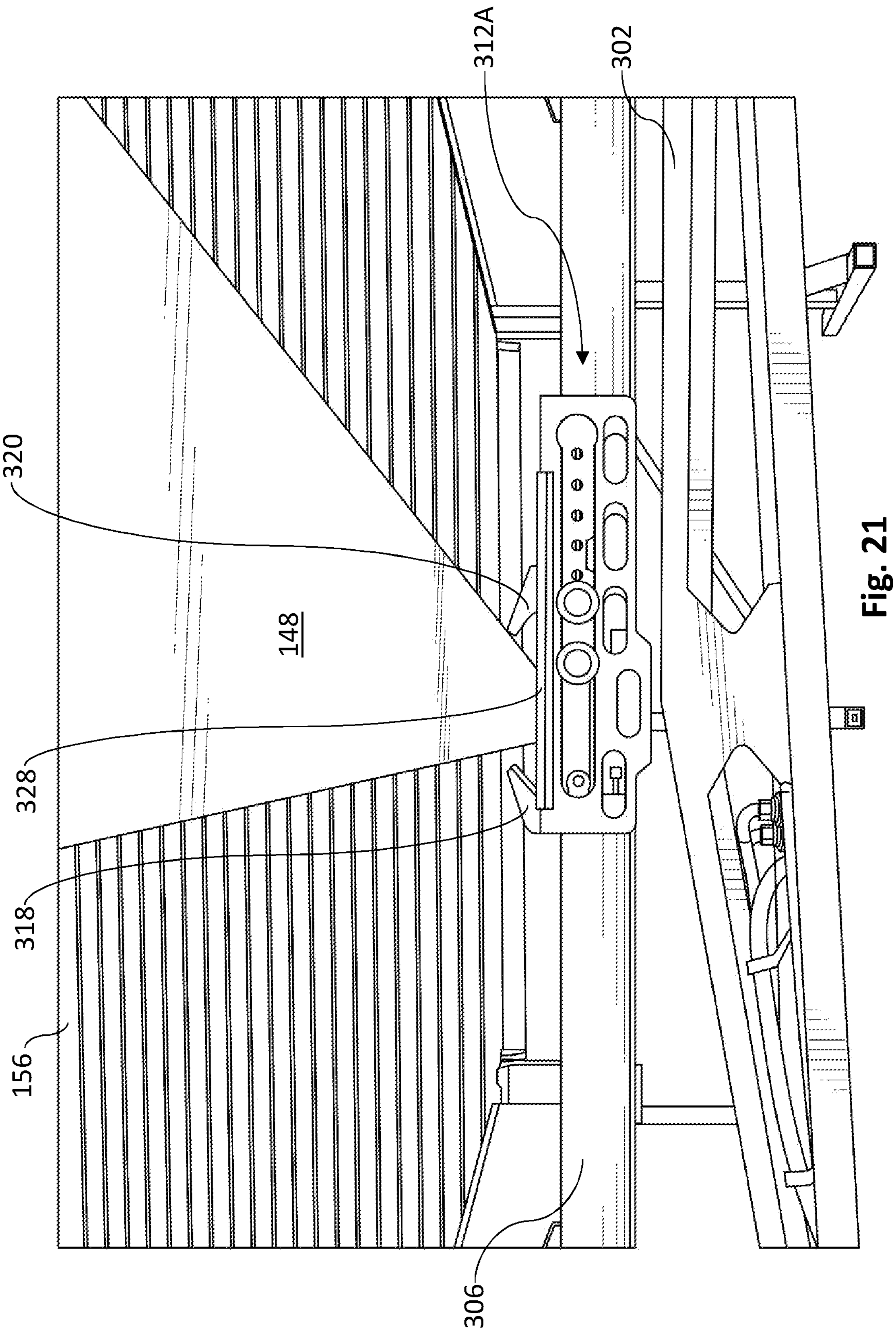
FIG. 21 illustrates a boom clamp attachment underneath an I-beam for clamping thereto.
Figure 22:
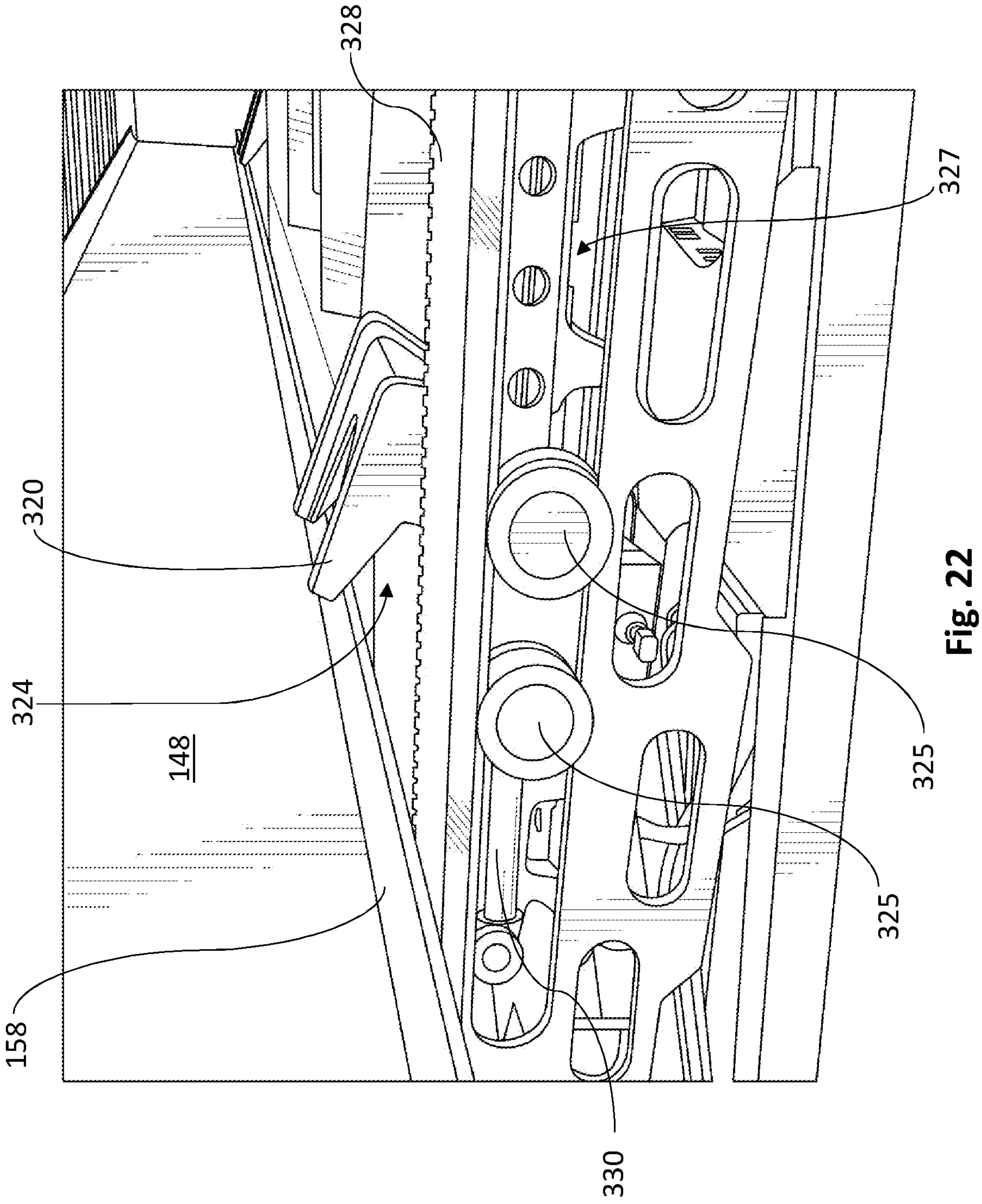
FIG. 22 illustrates a detailed view of a gib clamp of a boom clamp attachment in position to clamp an I-beam.

FIGS. 21-27 illustrate the boom clamp attachment 300 comprising a gib frame 302, shaft arm axle 306, at least one gib clamp 312A and a method of using the boom clamp attachment 300. In FIG. 21, the I-beam 148 abuts the grip plates 326, 328 (only one visible in this view). The operator then actuates the moveable clamping protrusions 320 coupled to linear actuators 330 (not visible in this view, but visible in FIG. 22 and illustrated in other embodiments herein). Further, in one embodiment, the clamping protrusions may glide easily and stay aligned using rollers 325 in channel 327. FIG. 22 illustrates how the lower flange 158 of the I-beam 148 is received in the receiving apertures 324 as clamping protrusions 320 approach the I-beam 148.

Figure 23:
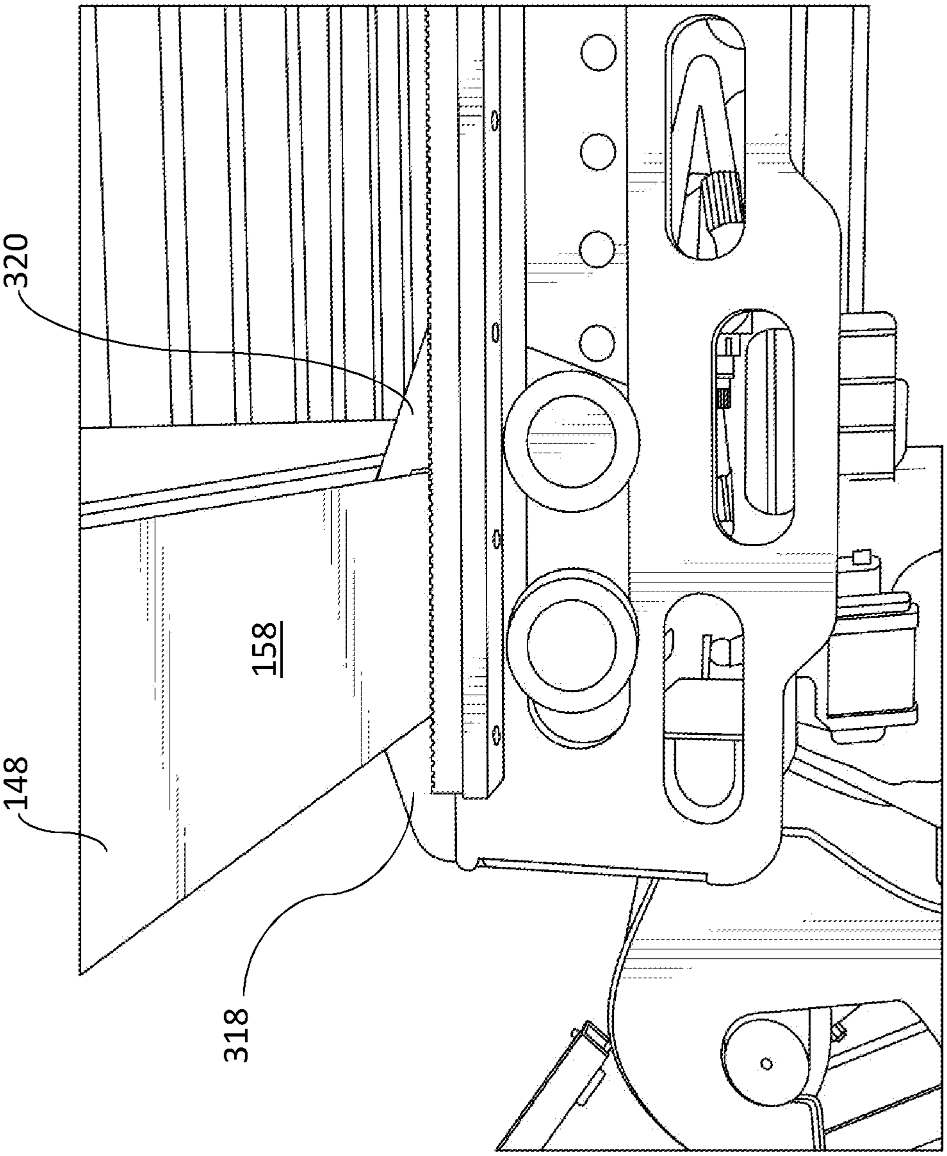
FIG. 23 illustrates a gib clamp of a boom clamp attachment clamped on an I-beam.

FIG. 23 illustrates first clamping protrusions 318 and second clamping protrusions 320 (collectively the "clamping mechanism") clamping an I-beam 148 via its lower flange 158. Either or both of the first and second clamping protrusions 318, 320 may be moved using a variety of linear actuators, including hydraulics, screw drives, rack and pinion, wheels in a track, and similar devices. While clamping protrusions 318, 320 are shown as the clamping mechanism, it will be appreciated that other clamping means may be used without departing herefrom.

Figure 24:
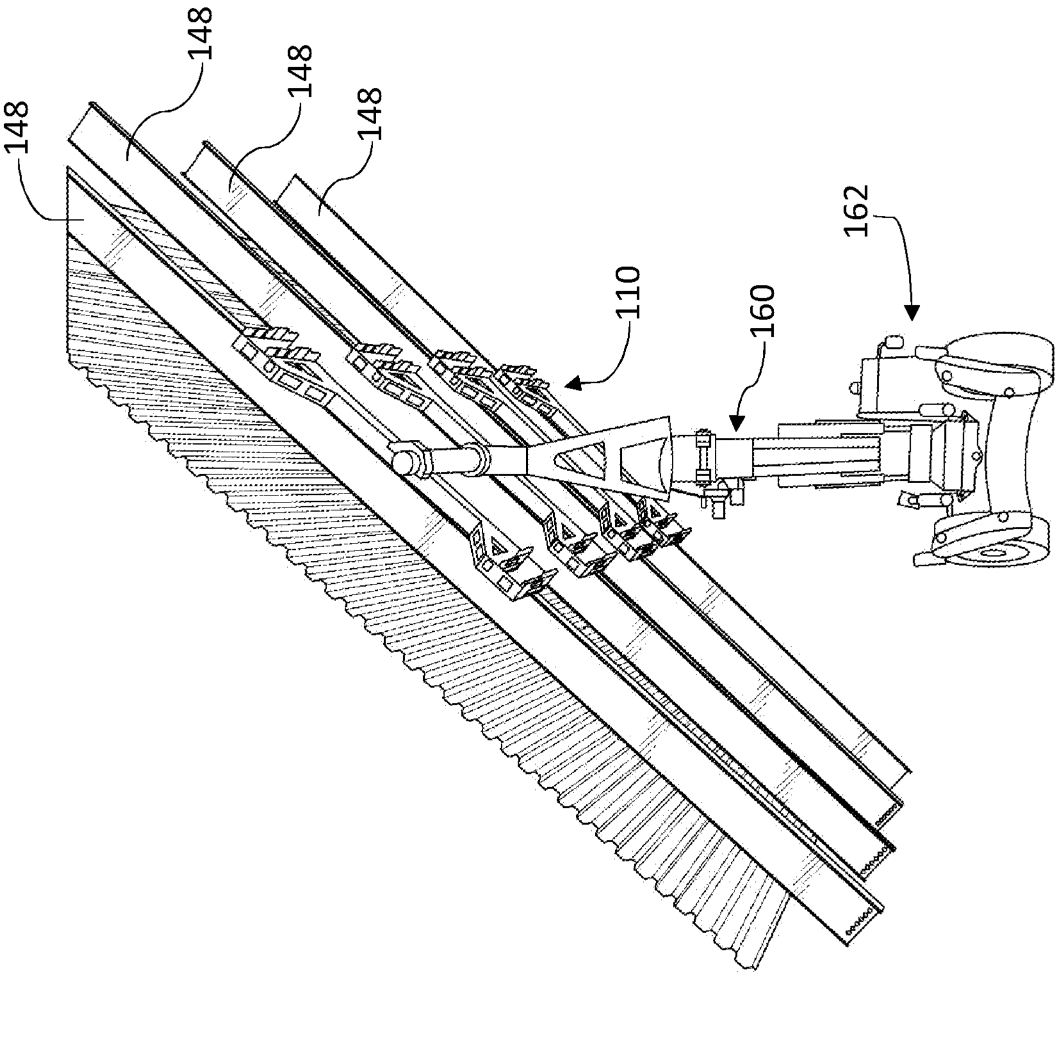
FIG. 24 illustrates a telescopic handler having a boom clamp attachment coupled thereto, the boom clamp attachment clamping a panel section and hoisting and tilting the same.
Figure 25:
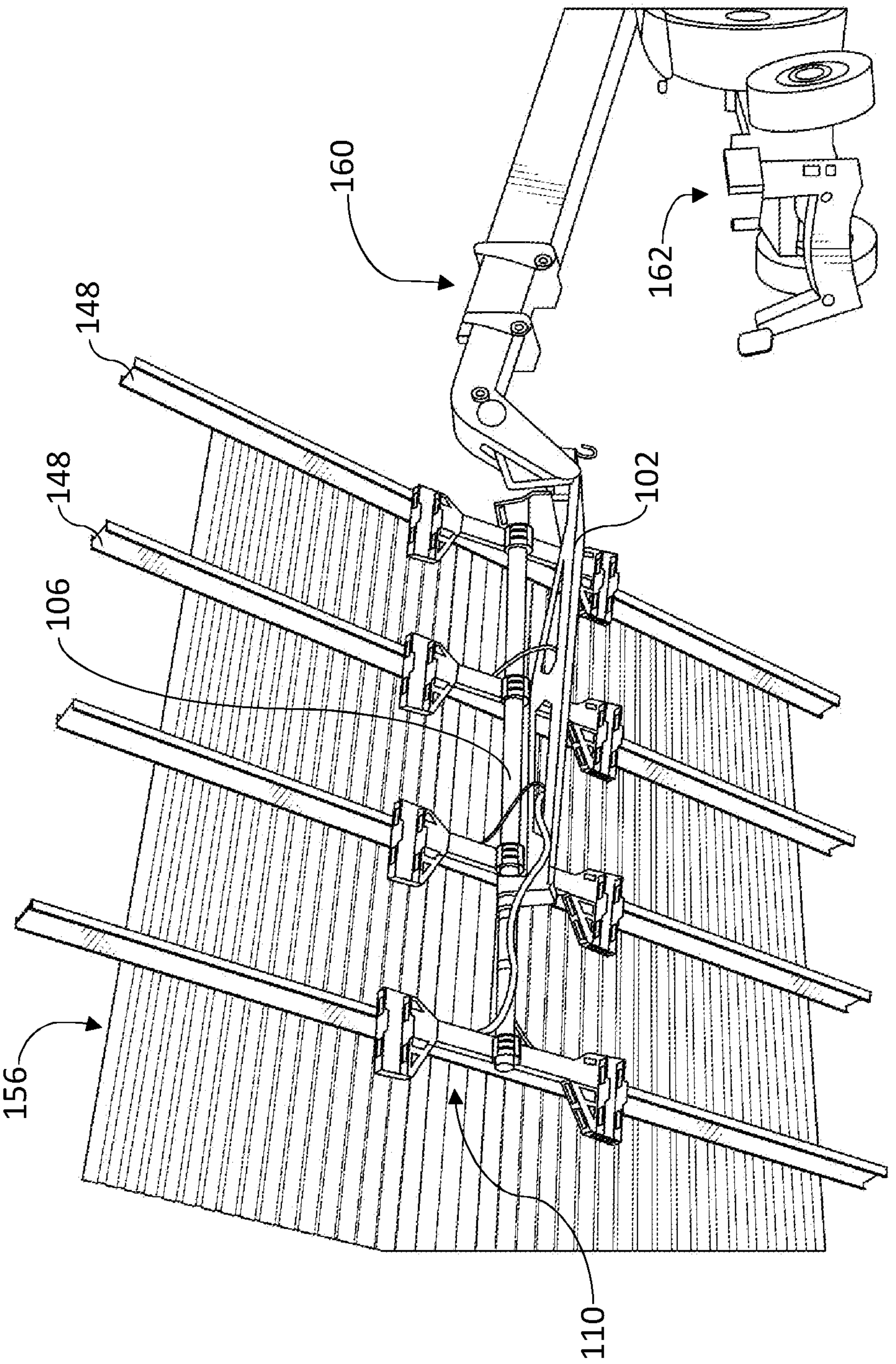
FIG. 25 illustrates a telescopic handler having a boom clamp attachment coupled thereto, the boom clamp attachment clamping a panel section and hoisting and tilting the same.
Figure 26:
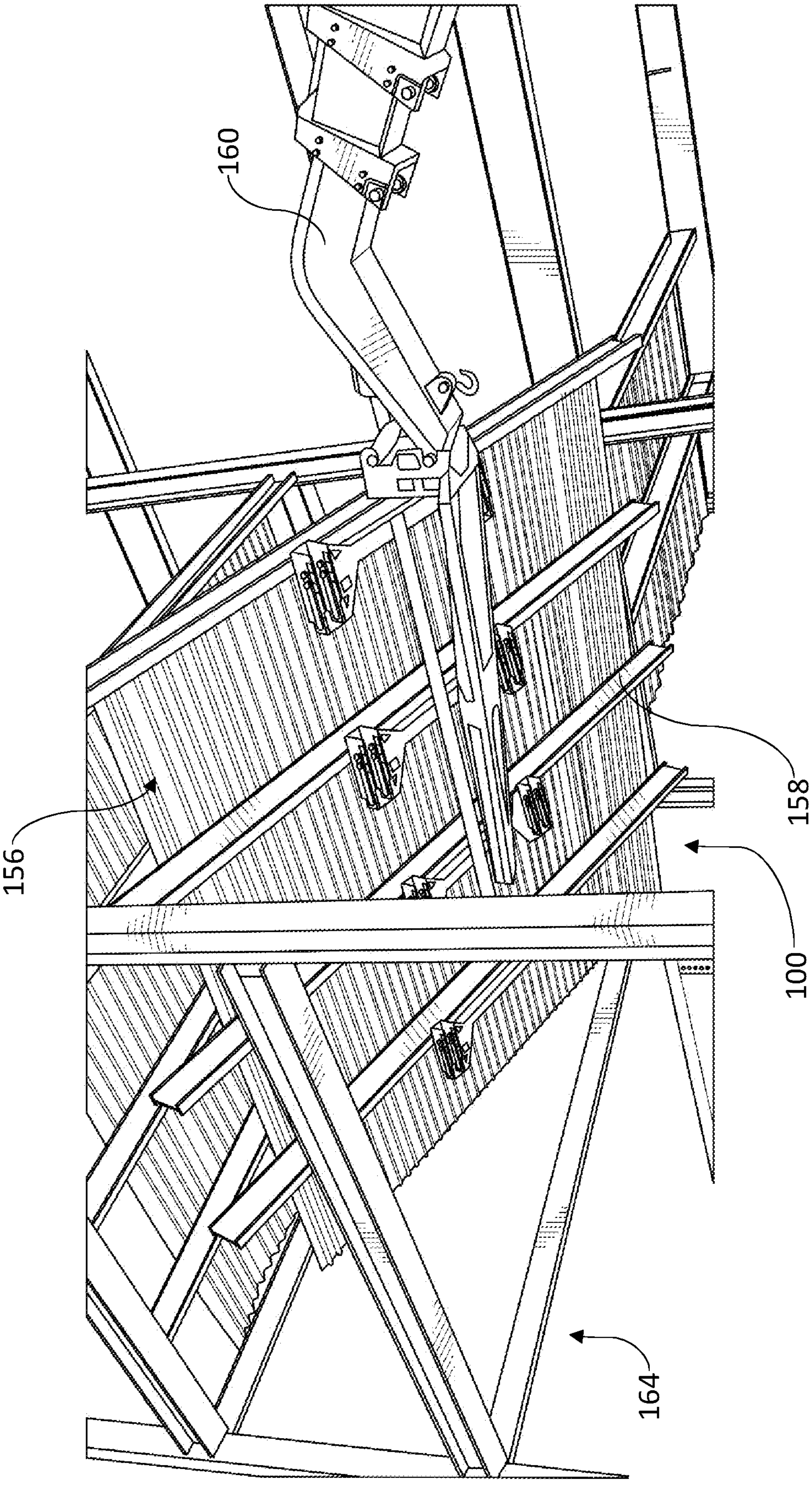
FIG. 26 illustrates a telescopic handler having a boom clamp attachment coupled thereto, the boom clamp attachment clamping a panel section and hoisting and tilting the same for insertion between building beams.
Figure 27:
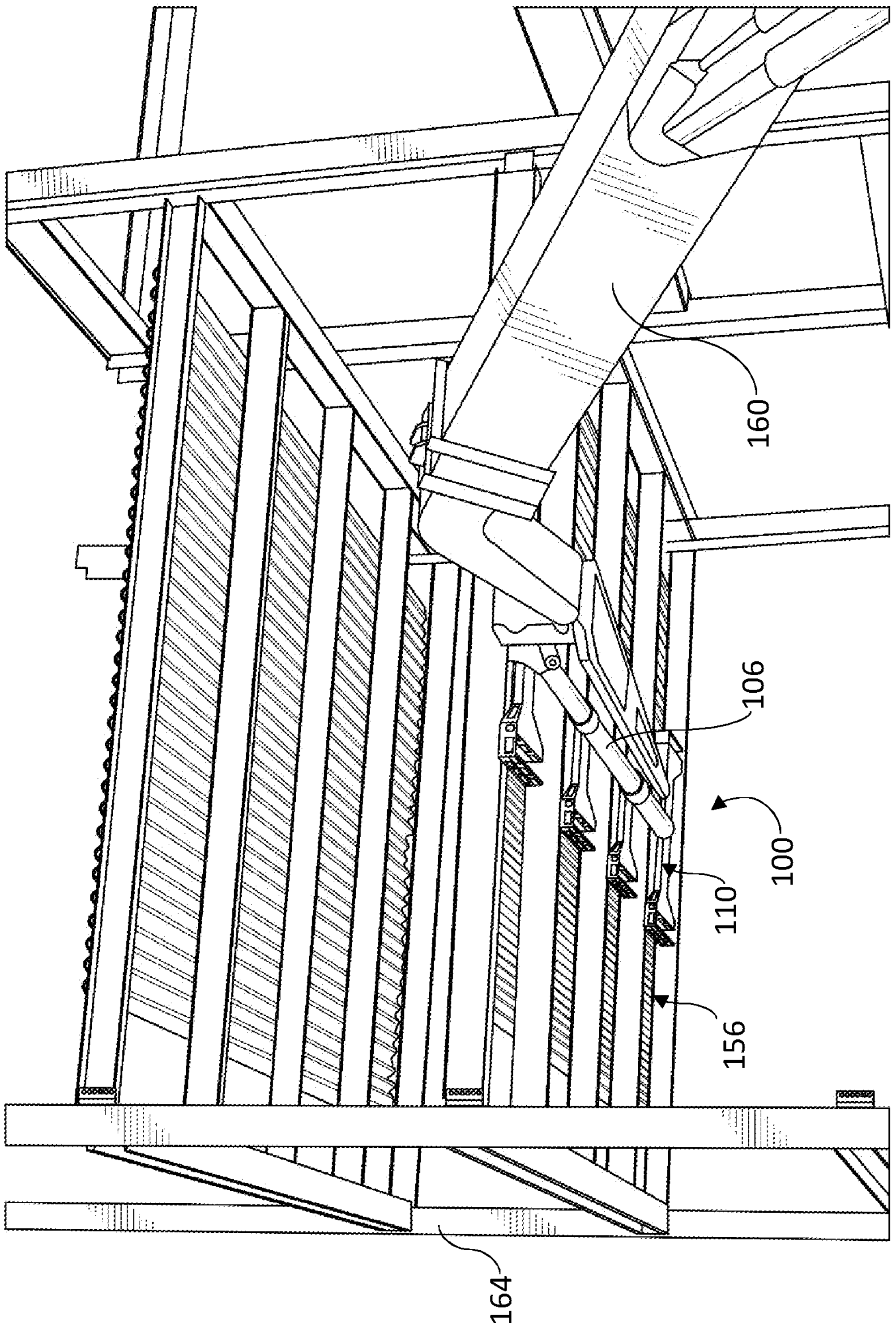
FIG. 27 illustrates a telescopic handler having a boom clamp attachment coupled thereto, the boom clamp attachment clamping a panel section placing it in the desired location for fastening.

FIGS. 24-25 illustrates how the boom clamp attachment 100 may rotate in relation to the boom 160 of the telescopic handler 162, tilting I-beams 148. It will be appreciated that while boom clamp attachment 100 is used as an example for ease of discussion, any of the boom clamp attachments 100, 200, 300 or any combination thereof may be used. As shown in FIG. 26, this allows the panel section 156 to be tilted so as to enter a confined space, such as building 164. As shown in FIG. 27, once the panel section 156 is within the confined space, the panel section 156 may be positioned (e.g., leveled) and fastened into place using bolts, welds, or other fasteners. Once fastened, the boom clamp attachment 100 may be released from the panel section 156. To release the boom clamp attachment, the operator opens the clamping protrusions (e.g., fixed fingers 122 and moving fingers 124), thereby releasing the I-beams. It will be appreciated that the shaft arm torque assembly (108 in FIGS. 1 and 4, or 206 in FIG. 13) allows the shaft arm axle 106 to rotate along its longitudinal axis, pivoting the gib clamp assemblies 110.

Therefore, in one embodiment, a method of using a boom clamp attachment 100 comprises quick-connecting the boom clamp attachment 100 to a telescopic handler 162. The boom clamp attachment 100 is then positioned beneath an assembled section of panels 156, the panels fastened to I-beams 148, as shown in FIGS. 21-27. Each of the gib clamp assemblies 110 are positioned beneath an I-beam 148 such that the clamping protrusions 318 and clamping protrusions 320 are on opposite sides of the I-beam 148 as shown in FIGS. 21-23. The clamping protrusion 320 is then actuated, causing the clamping protrusion 320 to approach the first clamping protrusion 318, clamping the I-beam 148 therebetween. As shown in FIGS. 24-27, once clamped, the telescopic handler 162 may lift the panel section 156 to the desired location for fastening (e.g., to a building 164). As appreciated, gib frame 102, 302 distributes the weight of the section 156 to the boom 160 of the telescopic handler 162. While I-beams were shown and described throughout, it will be appreciated that the invention is not so limited. In other words, in addition to grasping I-beams, the boom clamp attachment 100, 200, 300 can be adapted to handle groups of open web steel joists in the same manner. Accordingly, the use of a telehandler boom forklift 162 replaces the need for a crane and the specialized rigging needed to pick and raise a roof module to the installation point. This avenue further reduces project costs by removing the costs associated with a crane: logistics, maintenance, regulation, operator, training, weather delays, etc., and utilizing the versatility, availability, and much lower risk alternative of the telehandler 162. This method is only limited by the maximum reach of commercially available telehandler equipment.

Figure 28:
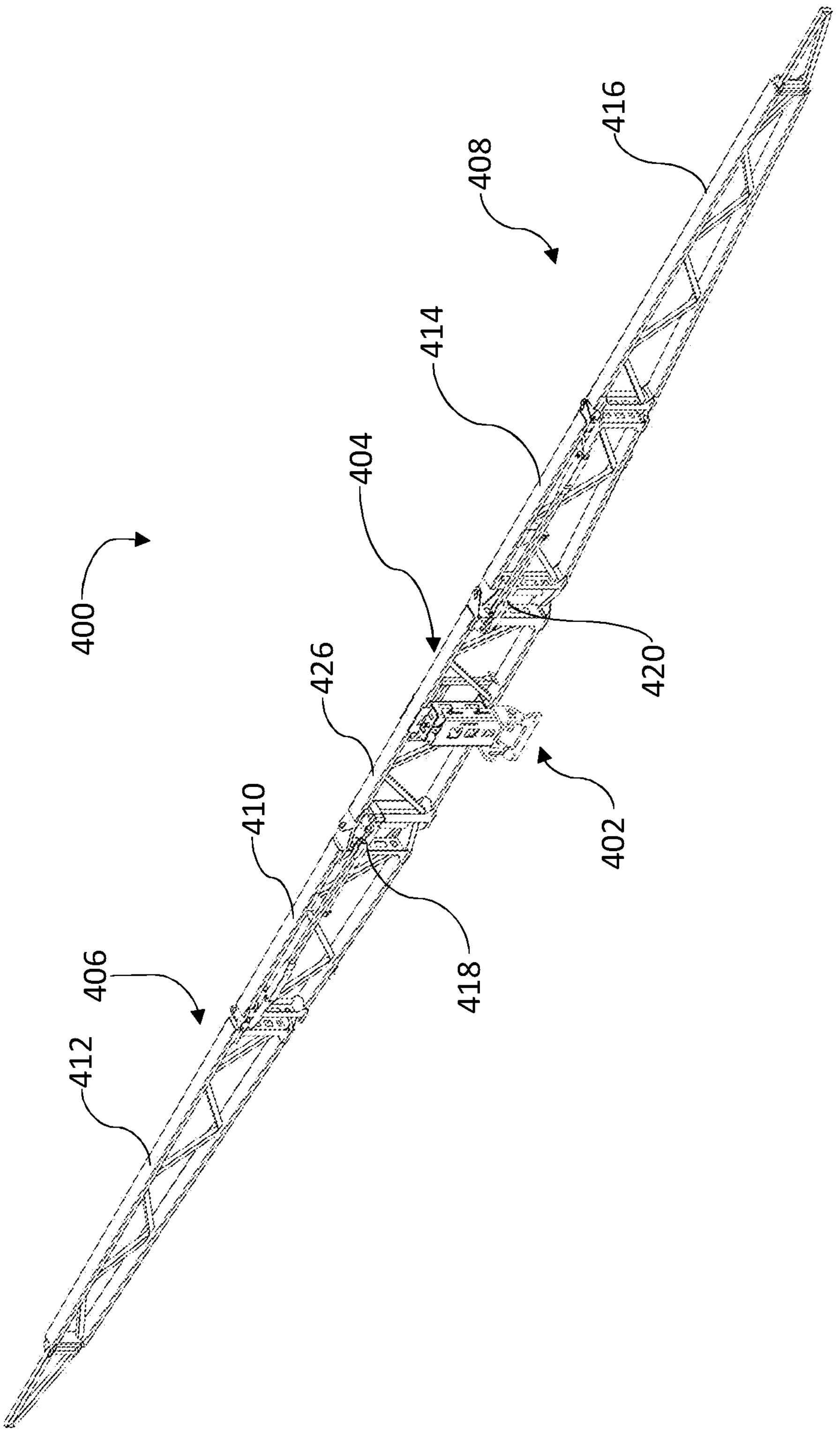
FIG. 28 illustrates a front perspective view of a deck support with a first arm and a second arm in an extended position.
Figure 29:
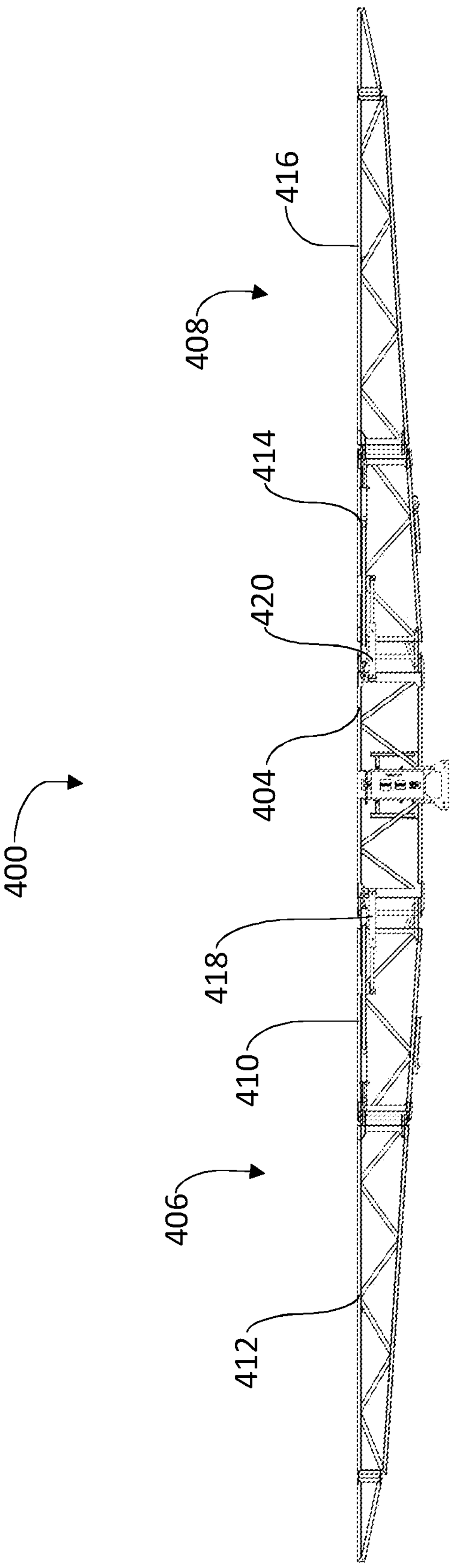
FIG. 29 illustrates a front elevation view of a deck support with a first arm and a second arm in an extended position.
Figure 30:
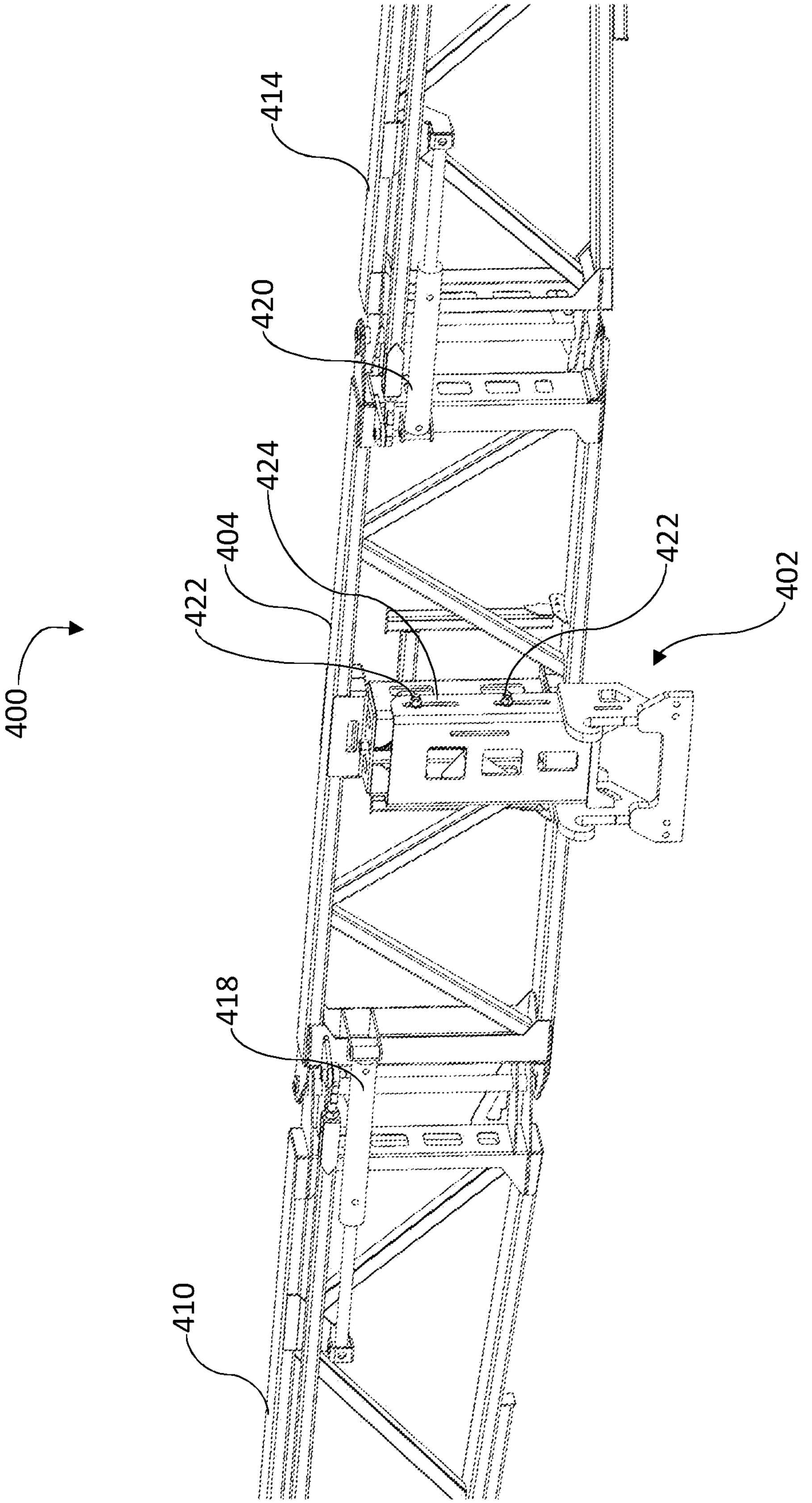
FIG. 30 illustrates a front, detailed perspective view of a coupler and linear actuators of a deck support.
Figure 31:
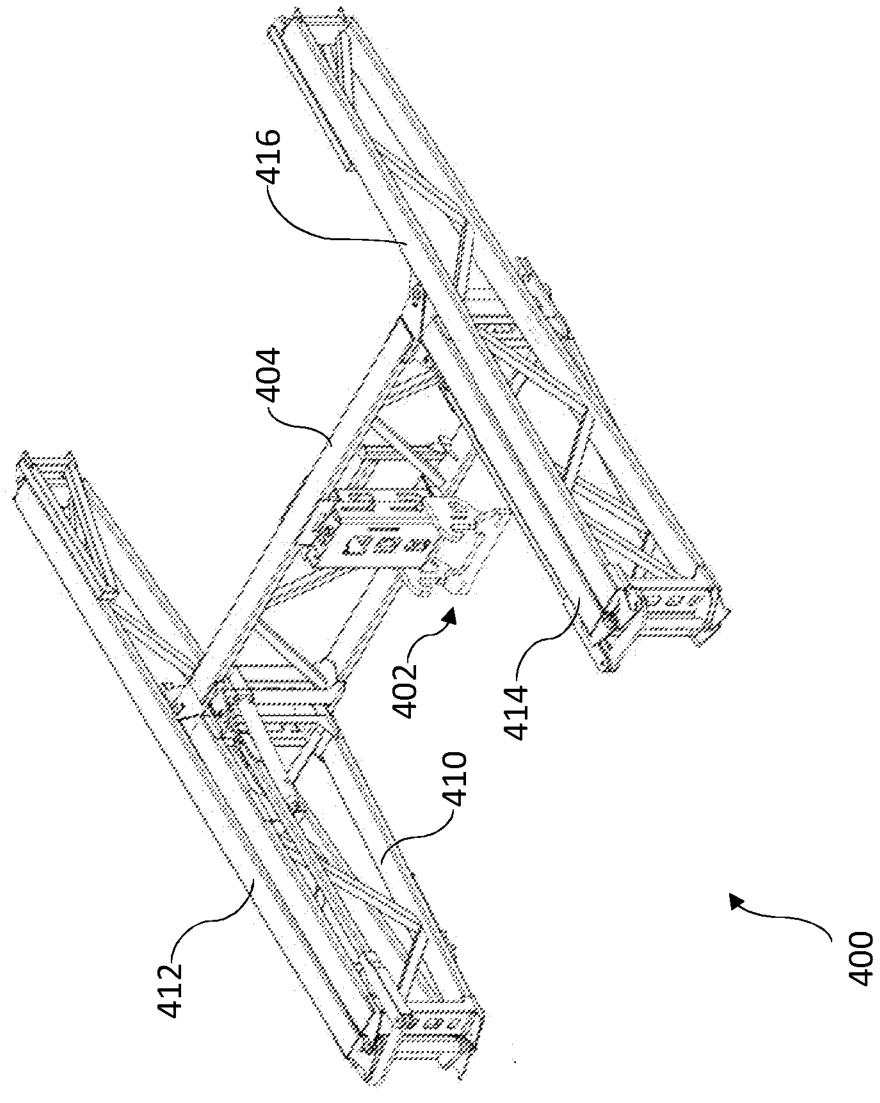
FIG. 31 illustrates a front, top perspective view of a deck support with a first arm and a second arm in a folded position.

In some circumstances, heavier I-beams are required for construction use. In such a scenario, the telescopic handler may not be capable of lifting a panel section having more than one of these heavier-duty I-beams. Therefore, the panel section may be assembled having only one I-beam. In such an instance, it may be preferable to support the remaining panel section during transport. To accomplish this, a deck support arm may be used. For example, as shown in FIG. 28, a deck support 400 comprises a coupler 402 (e.g., groove) for coupling to the quick-connect assembly (e.g., 205 in FIG. 13, which may be a tongue). The deck support 400 comprises center frame 404, first arm 406, and second arm 408. The first arm 406 may comprise first intermediate arm 410 and distal arm 412; the second arm 408 may comprise first intermediate arm 414 and distal arm 416. Each of the distal arms 412, 416 may be hingedly coupled to their respective intermediate arms 410, 414. Further, the intermediate arms 410, 414 may be hingedly coupled to the center frame 404. This allows the first arm 406 and second arm 408 to be foldable. The folding may be accomplished using linear actuators 418, 420 (e.g., hydraulics, screw drives, etc.). The deck support 400 is shown in a collapsed configuration in FIG. 31. The quick connect assembly 402 may be height adjustable as well, allowing for the arms 406, 408 to properly contact the panel section regardless of the size of the I-beam. This may be accomplished using bolts 422 in groove 424 (or similar adjustment mechanism, such as locking pins, cotter pins, etc.). Accordingly, an operator may quick-connect the deck support 400, where the top surface 406 can contact the portion of the panel section that is not supported by an I-beam. Once hoisted into position, the operator may actuate the linear actuators 418, 420 to fold the deck support 400 as shown in FIG. 31. Once folded, the deck support 400 may be easily withdrawn from the workspace.

Accordingly, it will be appreciated that the boom clamp attachment described above solves the need in the art for a system and method that reduces fall and injury risks, that reduces the number of workers working at elevated heights, that allows workers to assemble the decking material at ground level, and that allows for installation of the assembled decking panels with little labor.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A method of using a boom clamp attachment for maneuvering a section of panels, the method comprising:

assembling a panel section at ground level, the panel section comprising a plurality of I-beams, wherein the panel section is assembled using one or more holding brackets, the one or more holding brackets comprising a spring to position the one or more holding brackets;

placing the boom clamp attachment comprising (a) a gib frame extending longitudinally in relation to a boom and (b) a shaft arm axle comprising a plurality of gib clamp assemblies, beneath the assembled panel section via a telescopic handler, wherein each gib clamp assembly aligns, respectively, with an I-beam of the plurality of I-beams, each gib clamp assembly comprising a clamping mechanism;

clamping each I-beam, respectively, using the clamping mechanism of each respective gib clamp assembly; and rotating the panel section via rotation of the shaft arm axle of the boom clamp attachment longitudinally in relation to the gib frame.

2. A method of using a boom clamp attachment for maneuvering an assembled section of panels, the method comprising:

coupling the boom clamp attachment to a boom of a telescopic handler;

positioning the boom clamp attachment beneath an assembled panel section comprising decking material fastened to a plurality of structural members;

aligning a plurality of gib clamp assemblies of the boom clamp attachment with the plurality of structural members, respectively;

actuating a clamping mechanism of each respective gib clamp assembly to releasably clamp a respective structural member;

lifting the assembled panel section with the telescopic handler;

rotating the assembled panel section by rotating a shaft arm axle of the boom clamp attachment along a longitudinal axis and in relation to a gib frame of the boom clamp attachment to tilt the assembled panel section for positioning at an installation location; and releasing the assembled panel section by unclamping each respective structural member.

3. The method of claim 2, wherein each gib clamp assembly comprises first and second grip plates configured to contact opposing sides of the respective structural member during the clamping step.

4. The method of claim 2, wherein the plurality of structural members comprises a plurality of I-beams, wherein the clamping mechanism of each gib clamp assembly comprises first and second clamping protrusions each having a receiving aperture, and wherein releasably clamping the respective I-beam comprises receiving a lower flange of the respective I-beam in the receiving apertures.

5. The method of claim 2, wherein each gib clamp assembly is secured to the shaft arm axle by a saddle and keyway arrangement configured to prevent unwanted rotation of the gib clamp assembly and maintain the plurality of gib clamp assemblies in a linear array on a common geometric plane during the rotating step.

6. A method of assembling a panel section at ground level for installation on a building via a boom clamp attachment, the method comprising:

positioning a plurality of I-beams in a plurality of holding brackets, respectively, each holding bracket comprising a receiving side movable between a receiving position and a lowered position;

biasing the receiving side toward the receiving position using a spring;

placing an I-beam of the plurality of I-beams into the receiving side such that, in response to a weight of the I-beam, the receiving side moves toward the lowered position to captivate the I-beam at a predetermined position; and after fastening decking material to the plurality of I-beams to form the panel section, lifting the panel section such that removal of the weight causes the receiving side to return toward the receiving position via the spring.

7. The method of claim 6, wherein the receiving side comprises a V-shaped portion configured to funnel the I-beam to a center position.

8. The method of claim 6, further comprising lifting the panel section using a telescopic handler having the boom clamp attachment, the boom clamp attachment comprising a plurality of gib clamp assemblies configured to releasably clamp the plurality of I-beams, respectively.

9. The method of claim 8, wherein each gib clamp assembly comprises first and second grip plates configured to contact opposing sides of the respective I-beam during the clamping step.

10. The method of claim 6, further comprising rotating the panel section by rotating a shaft arm axle of the boom clamp attachment along a longitudinal axis to tilt the panel section for placement within the building.

* * * * *